US012732429B2

(12) United States Patent
Li et al.

(10) Patent No.: US 12,732,429 B2
(45) Date of Patent: Sep. 8, 2026

(54) DATA MANAGEMENT METHOD, APPARATUS, AND SYSTEM, AND STORAGE MEDIUM

(71) Applicant: Huawei Technologies Co., Ltd., Shenzhen (CN)

(72) Inventors: Yexing Li, Shanghai (CN); Yijun Yu, Dongguan (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 88 days.

(21) Appl. No.: 18/901,659

(22) Filed: Sep. 30, 2024

(65) Prior Publication Data

US 2025/0023788 A1 Jan. 16, 2025

Related U.S. Application Data

(63) Continuation of application No. PCT/CN2023/124927, filed on Oct. 17, 2023.

(30) Foreign Application Priority Data

Oct. 31, 2022 (CN) ........................ 202211349958.2

(51) Int. Cl.
*H04L 41/0894* (2022.01)
*H04L 43/50* (2022.01)

(52) U.S. Cl.
CPC .......... *H04L 41/0894* (2022.05); *H04L 43/50* (2013.01)

(58) Field of Classification Search
CPC ............................ H04L 41/0894; H04L 43/50
USPC ........................................................ 709/223
See application file for complete search history.

(56) References Cited

U.S. PATENT DOCUMENTS

| | | | | |
|---|---|---|---|---|
| 2019/0215235 | A1* | 7/2019 | Chou | H04L 43/16 |
| 2019/0253912 | A1* | 8/2019 | Yao | H04W 24/10 |
| 2022/0321435 | A1* | 10/2022 | Yao | H04W 24/08 |
| 2023/0228837 | A1* | 7/2023 | Kazmi | G01S 5/021 455/456.1 |
| 2023/0370879 | A1* | 11/2023 | Chou | H04W 24/08 |

(Continued)

FOREIGN PATENT DOCUMENTS

| | | |
|---|---|---|
| CN | 114501511 A | 5/2022 |

OTHER PUBLICATIONS

3rd Generation Partnership Project; Technical Specification Group Services and System Aspects; Management and orchestration; Performance assurance (Release 17). 3GPP TS 28.550 V17.0.0 (Mar. 2022). total 85 pages.

(Continued)

*Primary Examiner* — Ruolei Zong
(74) *Attorney, Agent, or Firm* — Conley Rose, P.C.

(57) ABSTRACT

A data management method includes network management service producer network elements that send, to a network management service consumer network element, moments at which measurement data of network objects is obtained for the first time after measurement jobs are activated. The network management service consumer network element creates digital twins based on measurement data of the network objects at a latest moment among the moments at which the network management service producer network elements obtain the measurement data of the network objects for the first time and after the latest moment.

20 Claims, 11 Drawing Sheets

(56) References Cited

U.S. PATENT DOCUMENTS

| | | | | |
|---|---|---|---|---|
| 2024/0129166 | A1* | 4/2024 | Au | H04L 25/0226 |
| 2024/0259879 | A1* | 8/2024 | Ranganath | G06N 5/01 |

OTHER PUBLICATIONS

3GPP TS 28.550 v2.0.0, Sep. 2018, 3rd Generation Partnership Project; Technical Specification Group Services and System Aspects; Management and orchestration; Performance assurance (Release 15), total 58 pages.

* cited by examiner

DATA MANAGEMENT METHOD, APPARATUS, AND SYSTEM, AND STORAGE MEDIUM

CROSS-REFERENCE TO RELATED APPLICATIONS

This is a continuation of International Patent Application No. PCT/CN2023/124927 filed on Oct. 17, 2023, which claims priority to Chinese Patent Application No. 202211349958.2 filed on Oct. 31, 2022. The disclosures of the aforementioned applications are hereby incorporated by reference in their entireties.

TECHNICAL FIELD

This disclosure relates to the field of communication technologies, and in particular, to a data management method, apparatus, and system, and a storage medium.

BACKGROUND

The communication industry is considering applying a digital twin technology to a communication network, to construct a virtual model of a physical entity by collecting data of a real network, and synchronously update the virtual model with a change of the real network. The virtual model may be referred to as a digital twin. The digital twin can reflect a real network environment, and therefore can be used for network performance prediction, fault detection, and the like. To improve consistency between the digital twin and the real network environment, the digital twin needs to exchange data with the real network. In addition, to improve accuracy of the digital twin, during network digital twinning across network objects, data reported by different network objects needs to be consistent in time sequence.

After a network management service consumer (networkMnS Consumer) network element sends measurement job creation request information to a network management service producer (network MnS Producer) network element corresponding to each network object, because the network management service producer network element needs to check, in a process of creating a measurement job, whether all data required by the measurement job can be collected, if the network management service producer network element does not establish a connection to a corresponding network function (NF), a connection needs to be established. In addition, when there is a large quantity of NFs, this measurement job creation process may take a long time. Because different network management service producer network elements may require different time for creating measurement jobs, start activation moments of the measurement jobs created by the different network management services are different, and further measurement data generated by these measurement jobs is different in time sequence, affecting quality of twin entities generated based on the measurement data, for example, degrading accuracy of a twin entity estimation operation.

How the network management service consumer network element creates, based on measurement data aligned in time sequence, digital twins used to simulate network objects is a problem to be resolved.

SUMMARY

This disclosure provides a data management method, apparatus, and system, and a storage medium, so that a network management service consumer network element can create, based on measurement data aligned in time sequence, a digital twin used to simulate each network object.

According to a first aspect, a data management method is provided. The method includes a network management service consumer network element that respectively sends first measurement job creation request information and second measurement job creation request information to a first network management service producer network element and a second network management service producer network element, where the first measurement job creation request information is used to request the first network management service producer network element to activate, at a first moment, a first measurement job used to obtain measurement data of a first network object, and periodically report the measurement data of the first network object to the network management service consumer network element at a target time interval, and the second measurement job creation request information is used to request the second network management service producer network element to activate, at the first moment, a second measurement job used to obtain measurement data of a second network object, and periodically report the measurement data of the second network object to the network management service consumer network element at a target time interval. The network management service consumer network element receives a second moment and/or first offset indication information from the first network management service producer network element, and a third moment and/or second offset indication information from the second network management service producer network element, where the second moment is a moment at which the measurement data of the first network object is obtained for the first time after the first measurement job is activated, the second moment and the first moment are spaced by an integer quantity of target time intervals, and the first offset indication information indicates that the second moment and the first moment are spaced by an integer quantity of target time intervals, and the third moment is a moment at which the measurement data of the second network object is obtained for the first time after the second measurement job is activated, the third moment and the first moment are spaced by an integer quantity of target time intervals, and the second offset indication information indicates that the third moment and the first moment are spaced by an integer quantity of target time intervals. When the second moment is earlier than or equal to the third moment, the network management service consumer network element respectively creates digital twins of the first network object and the second network object based on measurement data generated by the first network object and the second network object at the third moment and after the third moment, or when the second moment is later than or equal to the third moment, the network management service consumer network element respectively creates digital twins of the first network object and the second network object based on measurement data generated by the first network object and the second network object at the second moment and after the second moment.

In this aspect, the network management service producer network elements send, to the network management service consumer network element, the moments at which the measurement data of the network objects is obtained for the first time after the measurement jobs are activated, where the moment and the first moment sent by the network management service consumer network element are spaced by an integer quantity of target time intervals. The network management service consumer network element creates digital twins based on measurement data of the network objects at a latest moment among the moments at which the network management service producer network elements obtain the measurement data of the network objects for the first time and after the latest moment. In this way, the network management service consumer network element can create, based on measurement data aligned in time sequence, digital twins used to simulate the network objects.

In a possible implementation, the first measurement job creation request information includes a first time sequence alignment policy, and the first time sequence alignment policy indicates the first network management service producer network element to cause the first moment and a moment at which the measurement data of the first network object is generated for the first time after the first measurement job is activated to be spaced by an integer quantity of target time intervals when time at which the first measurement job is created is later than the first moment.

In another possible implementation, a first actual activation moment is a moment at which the first network management service producer network element activates the measurement job, the first actual activation moment and the first moment are spaced by n target time intervals, an interval between the first actual activation moment and the time at which the measurement job is created is less than one target time interval, n is a positive integer greater than or equal to 1, and the second moment and the first actual activation moment are spaced by one target time interval.

In still another possible implementation, that the network management service consumer network element receives a second moment and/or first offset indication information from the first network management service producer network element includes that the network management service consumer network element receives an alignment completion notification from the first network management service producer network element, where the alignment completion notification includes the second moment and/or the first offset indication information.

In still another possible implementation, the measurement job creation request information includes a second time sequence alignment policy, and the second time sequence alignment policy indicates the first network management service producer network element to report a second actual activation moment of the measurement job when time at which the measurement job is created is later than the first moment.

In still another possible implementation, the method further includes the following. The network management service consumer network element receives an activation timeout notification from the first network management service producer network element, where the activation timeout notification includes the second actual activation moment. The network management service consumer network element sends a time sequence alignment request to the first network management service producer network element, where the time sequence alignment request includes offset time. The network management service consumer network element receives a time sequence alignment response from the first network management service producer network element, where the time sequence alignment response includes the second moment and/or the offset indication information, where the second moment and the second actual activation moment are spaced by one target time interval and the offset time.

In still another possible implementation, after the network management service consumer network element receives the activation timeout notification from the first network management service producer network element, the method further includes the following. The network management service consumer network element obtains a time difference between the second actual activation moment and the first moment. That the network management service consumer network element sends a time sequence alignment request to the first network management service producer network element includes, when the time difference between the second actual activation moment and the first moment is greater than or equal to a specified threshold, sending the time sequence alignment request to the first network management service producer network element.

According to a second aspect, a data management method is provided. The method includes a network management service producer network element that receives measurement job creation request information from a network management service consumer network element, where the measurement job creation request information is used to request the network management service producer network element to activate, at a first moment, a measurement job used to obtain measurement data of a network object, and periodically report the measurement data of the network object to the network management service consumer network element at a target time interval. The network management service producer network element sends a second moment and/or offset indication information to the network management service consumer network element, where the second moment is a moment at which the measurement data of the network object is obtained for the first time after the measurement job is activated, the second moment and the first moment are spaced by an integer quantity of target time intervals, and the offset indication information indicates that the second moment and the first moment are spaced by an integer quantity of target time intervals.

In this aspect, the network management service consumer network element receives the moments that are sent by the network management service producer network elements and at which the measurement data of the network objects is obtained for the first time after the measurement jobs are activated, where the moment and the first moment sent by the network management service consumer network element are spaced by an integer quantity of target time intervals. The network management service consumer network element creates digital twins based on measurement data of the network objects at a latest moment among the moments at which the network management service producer network elements obtain the measurement data of the network objects for the first time and after the latest moment. In this way, the network management service consumer network element can create, based on measurement data aligned in time sequence, digital twins used to simulate the network objects.

In a possible implementation, after the network management service producer network element receives the measurement job creation request information, the method further includes the following. The network management service producer network element creates the measurement job based on the measurement job creation request information.

In another possible implementation, the measurement job creation request information includes a first time sequence alignment policy, and the first time sequence alignment policy indicates the network management service producer network element to cause the first moment and a moment at which the measurement data of the network object is generated for the first time after the measurement job is activated to be spaced by an integer quantity of target time intervals when time at which the measurement job is created is later than the first moment.

In still another possible implementation, the method further includes the following. The network management service producer network element determines a first actual activation moment and a second moment of the measurement job based on the measurement job creation request information, where the first actual activation moment is a moment at which the network management service producer network element activates the measurement job, the first actual activation moment and the first moment are spaced by n target time intervals, an interval between the first actual activation moment and the time at which the measurement job is created is less than one target time interval, n is a positive integer greater than or equal to 1, and the second moment and the first actual activation moment are spaced by one target time interval.

In still another possible implementation, that the network management service producer network element sends a second moment and/or offset indication information to the network management service consumer network element includes the following. The network management service producer network element sends an alignment completion notification to the network management service consumer network element, where the alignment completion notification includes the second moment and/or the offset indication information.

In still another possible implementation, the measurement job creation request information includes a second time sequence alignment policy, and the second time sequence alignment policy indicates the network management service producer network element to report a second actual activation moment of the measurement job when the time at which the measurement job is created is later than the first moment.

In still another possible implementation, the method further includes the following. The network management service producer network element activates the measurement job at the second actual activation moment. The network management service producer network element sends an activation timeout notification to the network management service consumer network element, where the activation timeout notification includes the second actual activation moment. The network management service producer network element receives a time sequence alignment request from the network management service consumer network element, where the time sequence alignment request includes offset time. The network management service producer network element determines the second moment based on the time sequence alignment request, where the second moment and the second actual activation moment are spaced by one target time interval and the offset time.

In still another possible implementation, that the network management service producer network element sends a second moment and/or offset indication information to the network management service consumer network element includes the following. The network management service producer network element sends a time sequence alignment response to the network management service consumer network element, where the time sequence alignment response includes the second moment and/or the offset indication information.

In still another possible implementation, the method further includes the network management service producer network element that sends, to the network management service consumer network element, measurement data that is of the network object and that is generated at the second moment, and measurement data that is of the network object and that is generated at a moment, where the moment and the second moment are spaced by an integer quantity of target time intervals.

According to a third aspect, a data management method is provided. The method includes a network management service consumer network element that respectively sends first measurement job creation request information and second measurement job creation request information to a first network management service producer network element and a second network management service producer network element, where the first measurement job creation request information is used to request the first network management service producer network element to activate, at a first moment, a first measurement job used to obtain measurement data of a first network object, and periodically report the measurement data of the first network object to the network management service consumer network element at a target time interval, and the second measurement job creation request information is used to request the second network management service producer network element to activate, at the first moment, a second measurement job used to obtain measurement data of a second network object, and periodically report the measurement data of the second network object to the network management service consumer network element at a target time interval. The first network management service producer network element sends a second moment and/or first offset indication information to the network management service consumer network element, where the second moment is a moment at which the measurement data of the first network object is obtained for the first time after the first measurement job is activated, the second moment and the first moment are spaced by an integer quantity of target time intervals, and the first offset indication information indicates that the second moment and the first moment are spaced by an integer quantity of target time intervals. The second network management service producer network element sends a third moment and/or second offset indication information to the network management service consumer network element, where the third moment is a moment at which the measurement data of the second network object is obtained for the first time after the second measurement job is activated, the third moment and the first moment are spaced by an integer quantity of target time intervals, and the second offset indication information indicates that the third moment and the first moment are spaced by an integer quantity of target time intervals. When the second moment is earlier than or equal to the third moment, the network management service consumer network element respectively creates digital twins of the first network object and the second network object based on measurement data generated by the first network object and the second network object at the third moment and after the third moment, or when the second moment is later than or equal to the third moment, the network management service consumer network element respectively creates digital twins of the first network object and the second network object based on measurement data generated by the first network object and the second network object at the second moment and after the second moment.

In this aspect, the network management service producer network elements send, to the network management service consumer network element, the moments at which the measurement data of the network objects is obtained for the first time after the measurement jobs are activated, where the moment and the first moment sent by the network management service consumer network element are spaced by an integer quantity of target time intervals. The network management service consumer network element creates digital twins based on measurement data of the network objects at a latest moment among the moments at which the network management service producer network elements obtain the measurement data of the network objects for the first time and after the latest moment. In this way, the network management service consumer network element can create, based on measurement data aligned in time sequence, digital twins used to simulate the network objects.

According to a fourth aspect, a data management method is provided. The method includes a network management service consumer network element that respectively sends first measurement job creation request information and second measurement job creation request information to a first network management service producer network element and a second network management service producer network element, where the first measurement job creation request information includes a first time sequence alignment indication, and the first time sequence alignment indication indicates the first network management service producer network element to wait for a first measurement job to be activated, and the second measurement job creation request information includes a second time sequence alignment indication, and the second time sequence alignment indication indicates the second network management service producer network element to wait for a second measurement job to be activated. The network management service consumer network element respectively receives first measurement job creation response information from the first network management service producer network element and second measurement job creation response information from the second network management service producer network element, where the first measurement job creation response information indicates that the first measurement job of a first network object has been created and the first measurement job of the first network object has not been activated, and the second measurement job creation response information indicates that the second measurement job of a second network object has been created and a second measurement job of the second network object has not been activated. The network management service consumer network element respectively sends first activation request information and second activation request information to the first network management service producer network element and the second network management service producer network element, where the first activation request information includes a first activation moment of the first measurement job, the second activation request information includes a second activation moment of the second measurement job, and the first activation moment is consistent with the second activation moment.

In this aspect, the network management service consumer network element indicates the network management service producer network element not to activate the measurement job after the measurement job is created, but activate the measurement job after the network management service consumer network element uniformly delivers the activation request information. In this way, the network management service consumer network element can create, based on measurement data aligned in time sequence, digital twins used to simulate the network objects.

In a possible implementation, the method further includes the following. The network management service consumer network element respectively receives first activation response information and a second activation response message from the first network management service producer network element and the second network management service producer network element, where the first activation response information indicates that the first measurement job of the first network object has been activated, and the second activation response information indicates that the second measurement job of the second network object has been activated.

According to a fifth aspect, a data management method is provided. The method includes a network management service producer network element that receives measurement job creation request information from a network management service consumer network element, where the measurement job creation request information includes a time sequence alignment indication, and the time sequence alignment indication indicates the network management service producer network element to wait for a measurement job of measurement data of a network object to be activated after the measurement job is created. The network management service producer network element sends measurement job creation response information to the network management service consumer network element, where the measurement job creation response information indicates that the measurement job has been created based on the measurement job creation request information and the measurement job has not been activated. The network management service producer network element receives activation request information from the network management service consumer network element, where the activation request information includes an activation moment of the measurement job, and the activation moment of the measurement job of the network object is consistent with an activation moment of another network object in a data management system. The network management service producer network element activates the measurement job at the activation moment.

In this aspect, according to an indication of the network management service consumer network element, the network management service producer network element does not activate the measurement job after creating the measurement job, but activates the measurement job after the network management service consumer network element uniformly delivers the activation request information. In this way, the network management service consumer network element can create, based on measurement data aligned in time sequence, digital twins used to simulate the network objects.

In a possible implementation, the method further includes the following. The network management service producer network element sends activation response information to the network management service consumer network element, where the activation response information indicates that the measurement job has been activated.

According to a sixth aspect, a data management method is provided. The method includes the following. A network management service consumer network element respectively sends first measurement job creation request information and second measurement job creation request information to a first network management service producer network element and a second network management service producer network element, where the first measurement job creation request information includes a first time sequence alignment indication, and the first time sequence alignment indication indicates the first network management service producer network element to wait for a first measurement job to be activated, and the second measurement job creation request information includes a second time sequence alignment indication, and the second time sequence alignment indication indicates the second network management service producer network element to wait for a second measurement job to be activated. The first network management service producer network element and the second network management service producer network element respectively send first measurement job creation response information and a second measurement job creation response message to the network management service consumer network element, where the first measurement job creation response information indicates that the first measurement job has been created based on the first measurement job creation request information and the first measurement job has not been activated, and the second measurement job creation response information indicates that the second measurement job has been created based on the second measurement job creation request information and the second measurement job has not been activated. The network management service consumer network element respectively sends first activation request information and second activation request information to the first network management service producer network element and the second network management service producer network element, where the first activation request information includes a first activation moment of the first measurement job, the second activation request information includes a second activation moment of the second measurement job, and the first activation moment is consistent with the second activation moment. The first network management service producer network element and the second network management service producer network element respectively activate the first measurement job and the second measurement job at the first activation moment and the second activation moment.

According to a seventh aspect, a data management apparatus is provided, and can implement the data management method in the first aspect. For example, the data management apparatus may be a chip or a network management service consumer network element. The foregoing method may be implemented by software, hardware, or hardware executing corresponding software.

In a possible implementation, the apparatus includes a transceiver unit configured to respectively send first measurement job creation request information and second measurement job creation request information to a first network management service producer network element and a second network management service producer network element, where the first measurement job creation request information is used to request the first network management service producer network element to activate, at a first moment, a first measurement job used to obtain measurement data of a first network object, and periodically report the measurement data of the first network object to the network management service consumer network element at a target time interval, and the second measurement job creation request information is used to request the second network management service producer network element to activate, at the first moment, a second measurement job used to obtain measurement data of a second network object, and periodically report the measurement data of the second network object to the network management service consumer network element at a target time interval, where the transceiver unit is further configured to receive a second moment and/or first offset indication information from the first network management service producer network element, and a third moment and/or second offset indication information from the second network management service producer network element, where the second moment is a moment at which the measurement data of the first network object is obtained for the first time after the first measurement job is activated, the second moment and the first moment are spaced by an integer quantity of target time intervals, and the first offset indication information indicates that the second moment and the first moment are spaced by an integer quantity of target time intervals, and the third moment is a moment at which the measurement data of the second network object is obtained for the first time after the second measurement job is activated, the third moment and the first moment are spaced by an integer quantity of target time intervals, and the second offset indication information indicates that the third moment and the first moment are spaced by an integer quantity of target time intervals, and a processing unit configured to, when the second moment is earlier than or equal to the third moment, respectively create digital twins of the first network object and the second network object based on measurement data generated by the first network object and the second network object at the third moment and after the third moment, or a processing unit configured to, when the second moment is later than or equal to the third moment, respectively create digital twins of the first network object and the second network object based on measurement data generated by the first network object and the second network object at the second moment and after the second moment.

Optionally, the first measurement job creation request information includes a first time sequence alignment policy, and the first time sequence alignment policy indicates the first network management service producer network element to cause the first moment and a moment at which the measurement data of the first network object is generated for the first time after the first measurement job is activated to be spaced by an integer quantity of target time intervals when time at which the first measurement job is created is later than the first moment.

Optionally, a first actual activation moment is a moment at which the first network management service producer network element activates the measurement job, the first actual activation moment and the first moment are spaced by n target time intervals, an interval between the first actual activation moment and the time at which the measurement job is created is less than one target time interval, n is a positive integer greater than or equal to 1, and the second moment and the first actual activation moment are spaced by one target time interval.

Optionally, the transceiver unit is further configured to receive an alignment completion notification from the first network management service producer network element, where the alignment completion notification includes the second moment and/or the first offset indication information.

Optionally, the measurement job creation request information includes a second time sequence alignment policy, and the second time sequence alignment policy indicates the first network management service producer network element to report a second actual activation moment of the measurement job when the time at which the measurement job is created is later than the first moment.

Optionally, the transceiver unit is further configured to receive an activation timeout notification from the first network management service producer network element, where the activation timeout notification includes the second actual activation moment. The transceiver unit is further configured to send a time sequence alignment request to the first network management service producer network element, where the time sequence alignment request includes offset time. The transceiver unit is further configured to receive a time sequence alignment response from the first network management service producer network element, where the time sequence alignment response includes the second moment and/or the offset indication information, where the second moment and the second actual activation moment are spaced by one target time interval and the offset time.

Optionally, the processing unit is further configured to obtain a time difference between the second actual activation moment and the first moment. The transceiver unit is further configured to send the time sequence alignment request to the first network management service producer network element when the time difference between the second actual activation moment and the first moment is greater than or equal to a specified threshold.

According to an eighth aspect, a data management apparatus is provided, and can implement the data management method in the second aspect. For example, the data management apparatus may be a chip or a network management service producer network element. The foregoing method may be implemented by software, hardware, or hardware executing corresponding software.

In a possible implementation, the apparatus includes a transceiver unit configured to receive measurement job creation request information from a network management service consumer network element, where the measurement job creation request information is used to request the network management service producer network element to activate, at a first moment, a measurement job used to obtain measurement data of a network object, and periodically report the measurement data of the network object to the network management service consumer network element at a target time interval. The transceiver unit is further configured to send a second moment and/or offset indication information to the network management service consumer network element, where the second moment is a moment at which the measurement data of the network object is obtained for the first time after the measurement job is activated, the second moment and the first moment are spaced by an integer quantity of target time intervals, and the offset indication information indicates that the second moment and the first moment are spaced by an integer quantity of target time intervals.

Optionally, the apparatus further includes a processing unit configured to create the measurement job based on the measurement job creation request information.

Optionally, the measurement job creation request information includes a first time sequence alignment policy, and the first time sequence alignment policy indicates the network management service producer network element to cause the first moment and a moment at which the measurement data of the network object is generated for the first time after the measurement job is activated to be spaced by an integer quantity of target time intervals when time at which the measurement job is created is later than the first moment.

Optionally, the processing unit is further configured to determine a first actual activation moment and a second moment of the measurement job based on the measurement job creation request information, where the first actual activation moment is a moment at which the network management service producer network element activates the measurement job, the first actual activation moment and the first moment are spaced by n target time intervals, an interval between the first actual activation moment and the time at which the measurement job is created is less than one target time interval, n is a positive integer greater than or equal to 1, and the second moment and the first actual activation moment are spaced by one target time interval.

Optionally, the transceiver unit is further configured to send an alignment completion notification to the network management service consumer network element, where the alignment completion notification includes the second moment and/or the offset indication information.

Optionally, the measurement job creation request information includes a second time sequence alignment policy, and the second time sequence alignment policy indicates the network management service producer network element to report a second actual activation moment of the measurement job when the time at which the measurement job is created is later than the first moment.

Optionally, the processing unit is further configured to activate the measurement job at the second actual activation moment. The transceiver unit is further configured to send an activation timeout notification to the network management service consumer network element, where the activation timeout notification includes the second actual activation moment. The transceiver unit is further configured to receive a time sequence alignment request from the network management service consumer network element, where the time sequence alignment request includes offset time. The processing unit is further configured to determine the second moment based on the time sequence alignment request, where the second moment and the second actual activation moment are spaced by one target time interval and the offset time.

Optionally, the transceiver unit is further configured to send a time sequence alignment response to the network management service consumer network element, where the time sequence alignment response includes the second moment and/or the offset indication information.

Optionally, the transceiver unit is further configured to send, to the network management service consumer network element, measurement data that is of the network object and that is generated at the second moment, and measurement data that is of the network object and that is generated at a moment, where the moment and the second moment are spaced by an integer quantity of target time intervals.

According to a ninth aspect, a data management system is provided. The system includes a network management service consumer network element configured to respectively send first measurement job creation request information and second measurement job creation request information to a first network management service producer network element and a second network management service producer network element, where the first measurement job creation request information is used to request the first network management service producer network element to activate, at a first moment, a first measurement job used to obtain measurement data of a first network object, and periodically report the measurement data of the first network object to the network management service consumer network element at a target time interval, and the second measurement job creation request information is used to request the second network management service producer network element to activate, at the first moment, a second measurement job used to obtain measurement data of a second network object, and periodically report the measurement data of the second network object to the network management service consumer network element at a target time interval, the first network management service producer network element configured to send a second moment and/or first offset indication information to the network management service consumer network element, where the second moment is a moment at which the measurement data of the first network object is obtained for the first time after the first measurement job is activated, the second moment and the first moment are spaced by an integer quantity of target time intervals, and the first offset indication information indicates that the second moment and the first moment are spaced by an integer quantity of target time intervals, and the second network management service producer network element configured to send a third moment and/or second offset indication information to the network management service consumer network element, where the third moment is a moment at which the measurement data of the second network object is obtained for the first time after the second measurement job is activated, the third moment and the first moment are spaced by an integer quantity of target time intervals, and the second offset indication information indicates that the third moment and the first moment are spaced by an integer quantity of target time intervals. When the second moment is earlier than or equal to the third moment, the network management service consumer network element is configured to respectively create digital twins of the first network object and the second network object based on measurement data generated by the first network object and the second network object at the third moment and after the third moment, or when the second moment is later than or equal to the third moment, the network management service consumer network element is configured to respectively create digital twins of the first network object and the second network object based on measurement data generated by the first network object and the second network object at the second moment and after the second moment.

According to a tenth aspect, a data management apparatus is provided, and can implement the data management method in the fourth aspect. For example, the data management apparatus may be a chip or a network management service consumer network element. The foregoing method may be implemented by software, hardware, or hardware executing corresponding software.

In a possible implementation, the apparatus includes a transceiver unit configured to respectively send first measurement job creation request information and second measurement job creation request information to a first network management service producer network element and a second network management service producer network element, where the first measurement job creation request information includes a first time sequence alignment indication, and the first time sequence alignment indication indicates the first network management service producer network element to wait for a first measurement job to be activated, and the second measurement job creation request information includes a second time sequence alignment indication, and the second time sequence alignment indication indicates the second network management service producer network element to wait for a second measurement job to be activated. The transceiver unit is further configured to respectively receive first measurement job creation response information from the first network management service producer network element and second measurement job creation response information from the second network management service producer network element, where the first measurement job creation response information indicates that the first measurement job of a first network object has been created and the first measurement job of the first network object has not been activated, and the second measurement job creation response information indicates that the second measurement job of a second network object has been created and the second measurement job of the second network object has not been activated. The transceiver unit is further configured to respectively send first activation request information and second activation request information to the first network management service producer network element and the second network management service producer network element, where the first activation request information includes a first activation moment of the first measurement job, the second activation request information includes a second activation moment of the second measurement job, and the first activation moment is consistent with the second activation moment.

Optionally, the apparatus further includes the transceiver unit is further configured to respectively receive first activation response information and a second activation response message from the first network management service producer network element and the second network management service producer network element, where the first activation response information indicates that the first measurement job of the first network object has been activated, and the second activation response information indicates that the second measurement job of the second network object has been activated.

According to an eleventh aspect, a data management apparatus is provided, and can implement the data management method in the fifth aspect. For example, the data management apparatus may be a chip or a network management service producer network element. The foregoing method may be implemented by software, hardware, or hardware executing corresponding software.

In a possible implementation, the apparatus includes a transceiver unit configured to receive measurement job creation request information from a network management service consumer network element, where the measurement job creation request information includes a time sequence alignment indication, and the time sequence alignment indication indicates the network management service producer network element to wait for a measurement job of measurement data of a network object to be activated after the measurement job is created, where the transceiver unit is further configured to send measurement job creation response information to the network management service consumer network element, where the measurement job creation response information indicates that the measurement job has been created based on the measurement job creation request information and the measurement job has not been activated, and the transceiver unit is further configured to receive activation request information from the network management service consumer network element, where the activation request information includes an activation moment of the measurement job, and the activation moment of the measurement job of the network object is consistent with an activation moment of another network object in a data management system, and a processing unit configured to activate the measurement job at the activation moment.

Optionally, the transceiver unit is further configured to send, by the network management service consumer network element, activation response information, where the activation response information indicates that the measurement job has been activated.

According to a twelfth aspect, a data management system is provided. The system includes a network management service consumer network element configured to respectively send first measurement job creation request information and second measurement job creation request information to a first network management service producer network element and a second network management service producer network element, where the first measurement job creation request information includes a first time sequence alignment indication, and the first time sequence alignment indication indicates the first network management service producer network element to wait for a first measurement job to be activated, and the second measurement job creation request information includes a second time sequence alignment indication, and the second time sequence alignment indication indicates the second network management service producer net work element to wait for a second measurement job to be activated, the first network management service producer network element configured to send first measurement job creation response information to the network management service consumer network element, where the first measurement job creation response information indicates that the first measurement job has been created based on the first measurement job creation request information and the first measurement job has not been activated, and the second network management service producer network element configured to send a second measurement job creation response message to the network management service consumer network element, where the second measurement job creation response information indicates that the second measurement job has been created based on the second measurement job creation request information and the second measurement job has not been activated. The network management service consumer network element is further configured to respectively send first activation request information and second activation request information to the first network management service producer network element and the second network management service producer network element, where the first activation request information includes a first activation moment of the first measurement job, the second activation request information includes a second activation moment of the second measurement job, and the first activation moment is consistent with the second activation moment. The first network management service producer network element is further configured to activate the first measurement job at the first activation moment. The second network management service producer network element is further configured to activate the second measurement job at the second activation moment.

With reference to any one of the seventh aspect, the eighth aspect, the tenth aspect, or the eleventh aspect, in another possible implementation, the data management apparatus in any one of the seventh aspect, the eighth aspect, the tenth aspect, or the eleventh aspect includes a processor coupled to a memory. The processor is configured to support the apparatus to perform a corresponding function in the foregoing data management method. The memory is configured to be coupled to the processor, and stores a program (instructions) and/or data necessary for the apparatus. Optionally, the data transmission apparatus may further include a communication interface configured to support communication between the apparatus and another network element. Optionally, the memory may be located inside the data management apparatus, or may be located outside the data management apparatus.

With reference to any one of the seventh aspect, the eighth aspect, the tenth aspect, or the eleventh aspect, in another possible implementation, the data management apparatus in any one of the seventh aspect, the eighth aspect, the tenth aspect, or the eleventh aspect includes a processor and a transceiver apparatus. The processor is coupled to the transceiver apparatus, the processor is configured to execute a computer program or instructions to control the transceiver apparatus to receive and send information, and when the processor executes the computer program or instructions, the processor is further configured to implement the foregoing method by using a logic circuit or by executing code instructions. The transceiver apparatus may be a transceiver, a transceiver circuit, or an input/output interface, and is configured to receive a signal from an apparatus other than the data management apparatus and transmit the signal to the processor, or transmit a signal from the processor to an apparatus other than the data management apparatus. When the data transmission apparatus is a chip, the transceiver apparatus is a transceiver circuit or an input/output interface.

When the data management apparatus in any one of the seventh aspect, the eighth aspect, the tenth aspect, or the eleventh aspect is a chip or a chip module, the sending unit may be an output unit such as an output circuit or a communication interface, and the receiving unit may be an input unit such as an input circuit or a communication interface. When the data management apparatus is a terminal or an access network device, the sending unit may be a transmitter, and the receiving unit may be a receiver.

According to a thirteenth aspect, a computer-readable storage medium is provided. The computer-readable storage medium stores a computer program or instructions, and when a computer executes the computer program or the instructions, the methods in the foregoing aspects is implemented.

According to a fourteenth aspect, a computer program product including instructions is provided. When the instructions are run on a data management apparatus, the data management apparatus is enabled to perform the methods in the foregoing aspects.

DESCRIPTION OF EMBODIMENTS

The following describes embodiments of this disclosure with reference to the accompanying drawings in embodiments of this disclosure.

A network object in embodiments of this disclosure may be a network domain, a network element, or the like. The network domain (or domain) indicates a physical or logical entity formed by network devices in a same network management scope. For example, the network domain may be a wireless domain, a core network domain, a transport domain, or a mobile network end-to-end domain. The wireless domain may include a base station, a cell, user equipment (UE), a network device in a wireless device management system, and the like. The core network domain may include a core network element, for example, a session management function (SMF) network element, a network data analytics function (NWDAF) network element, an access and mobility management function (AMF), or a network device in a core network device management system. The transport domain may include a switch, a router, a network device in a transport network device management system, and the like. The mobile network end-to-end domain includes network devices in the wireless domain, the core network domain, the transport domain, and a network management system (NMS). The network element is also referred to as a network function (NF). Each network domain may include one or more network elements.

Figure 1:
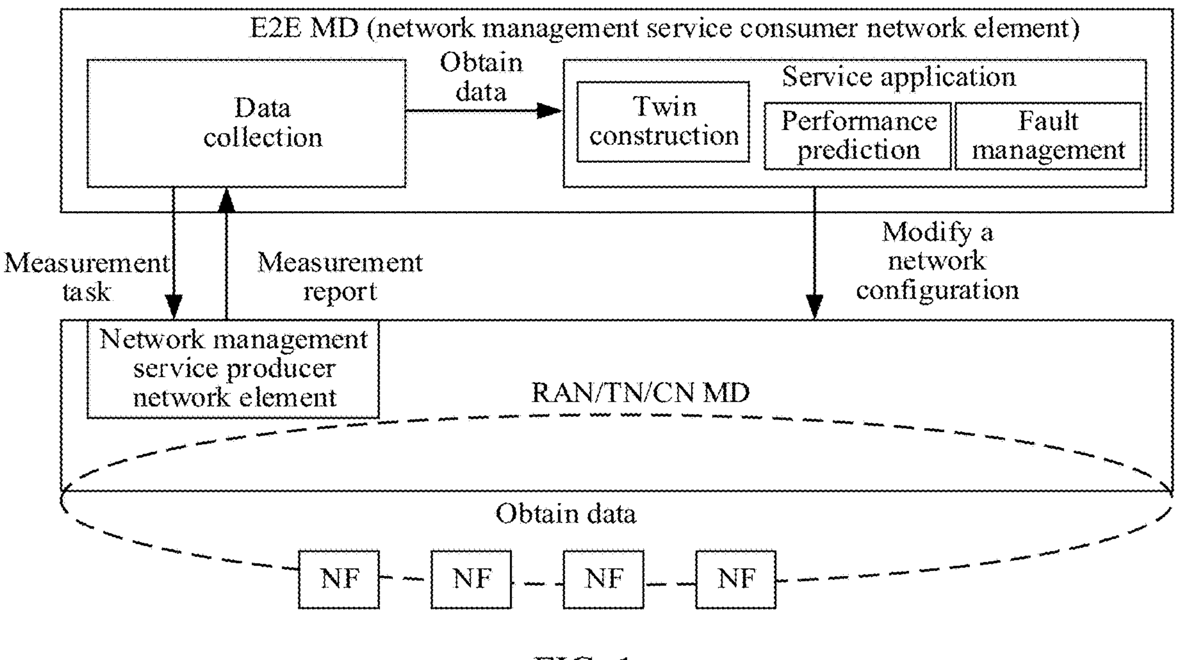
FIG. 1 is a diagram of a structure of a data management system across network domains to which an embodiment of this disclosure is applicable.

FIG. 1 is a diagram of a structure of a data management system across network domains to which an embodiment of this disclosure is applicable. The data management system includes one or more NFs in an end-to-end (E2E) management domain (MD), a radio access network (RAN) MD/transport network (TN) MD/core network (CN) MD, and a RAN/TN/CN MD.

The E2E MD may correspond to an NMS or an operations support system (OSS). The RAN/TN/CN MD may correspond to an element management system (EMS). The NF may correspond to an access network device, a transport network device, or a core network device, such as a base station, a switch, a router, or a core network element (such as an SMF, an AMF, or an NWDAF).

A network management service consumer network element is a management service consumer logical entity or physical entity deployed in the NMS, and is a management service invoker. In embodiments of this disclosure, the network management service consumer network element is a data collection service consumer, and is responsible for delivering a measurement job and obtaining a measurement report. The network management service consumer network element receives a measurement report reported by a network management service producer network element in the RAN/TN/CN MD, that is, the network management service consumer network element collects measurement data across network objects.

The network management service producer network element is a management service producer logical entity or physical entity deployed in the EMS, and is a management service producer. In embodiments of this disclosure, the network management service producer network element is a collection service producer, and is responsible for establishing a measurement job, generating measurement data, and sending a measurement report to a network management service consumer network element. The measurement report includes the measurement data.

One or more service applications may be deployed in the NMS. The service application is an application entity of measurement data, and processes and analyzes measurement data, to monitor a network status, or generate or modify a network configuration command. For example, the service application may be network twin construction, performance prediction, or fault prediction. The network configuration command may be adjusting an antenna tilt angle of a base station, turning on an algorithm switch of the base station, or the like.

Figure 2:
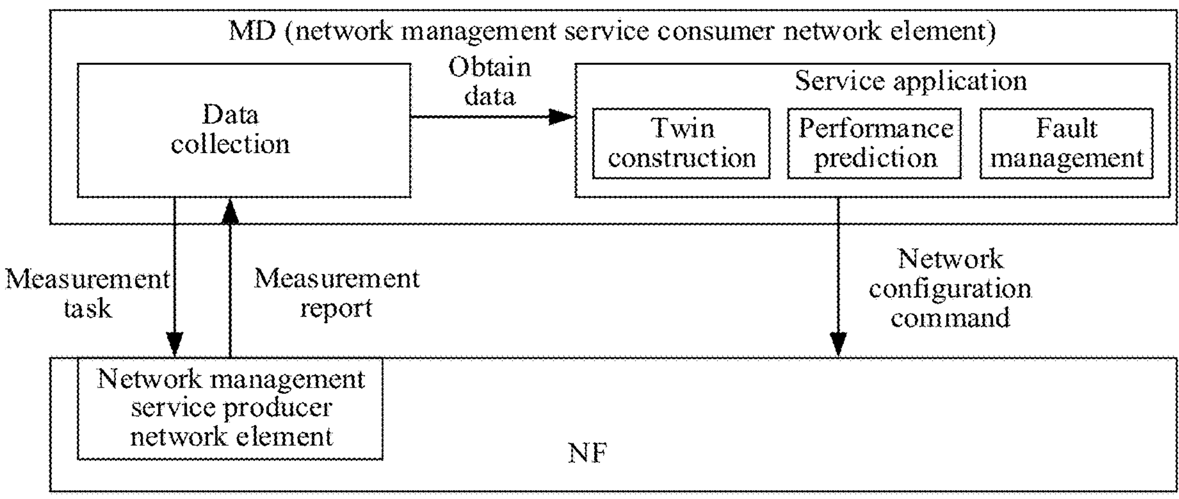
FIG. 2 is a diagram of a structure of a data management system in a single network domain to which an embodiment of this disclosure is applicable.

FIG. 2 is a diagram of a structure of a data management system in a single network domain to which an embodiment of this disclosure is applicable. The data management system includes an MD and one or more NFs (one NF is shown in the figure). The MD may correspond to an EMS, and the NF may correspond to an access network device, a transport network device, or a core network device, such as a base station, a switch, a router, or a core network element (such as an SMF, an AMF, or an NWDAF).

A network management service consumer network element is a management service consumer logical entity or physical entity deployed in the EMS, and is a management service invoker. In embodiments of this disclosure, the network management service consumer network element is a collection service consumer, and is responsible for delivering a measurement job and obtaining a measurement report. The network management service consumer network element receives a measurement report reported by the NF, that is, the network management service consumer network element collects measurement data of each NF in the EMS.

A network management service producer network element is a management service producer logical entity or physical entity deployed in the NF, and is a management service producer. In embodiments of this disclosure, the network management service producer network element is a collection service producer, and is responsible for establishing a measurement job, generating measurement data, and sending a measurement report to a network management service consumer network element. The measurement report includes the measurement data.

One or more service applications may be deployed in the EMS. The service application is an application entity of measurement data, and processes and analyzes measurement data, to monitor a network status, or generate or modify a network configuration command. For example, the service application may be network twin construction, performance prediction, or fault prediction. The network configuration command may be adjusting an antenna tilt angle of a base station, turning on an algorithm switch of the base station, or the like.

The concept of digital twins is proposed to digitally establish virtual models of physical entities, and digitize the physical world based on historical data, real-time data, and algorithm models, to implement synchronous analysis, prediction, and improvement and optimization of the physical entities. The digital twin includes three basic elements: a physical entity, a virtual object, and data interaction between the two.

To better simulate and test a plurality of scenarios in a physical environment, the digital twins need to perform data interaction with the physical world in real time. More frequent interaction indicates more timely collected data, and more accurate simulation and prediction effects. Therefore, the digital twins impose strict requirements on accuracy, timeliness, and interactivity of data collection and feedback in the physical world.

With reduction of costs of data storage, computing, and transmission and continuous improvement of data processing capabilities, the digital twins is emerging and have been applied in many fields.

The communication industry is considering applying digital twin technologies to communication networks, and using digital twins to simulate real network environments, and perform network performance prediction, fault detection, and the like, and a large amount of research and standardization work has been carried out on application of digital twins in networks. Data interaction is one of important links of network digital twinning.

When a network management service consumer network element creates digital twins across network objects, measurement data reported by network management service producer network elements needs to be consistent in time sequence, so that the digital twins of the network objects created by the network management service consumer network element are aligned in time sequence.

Figure 3:
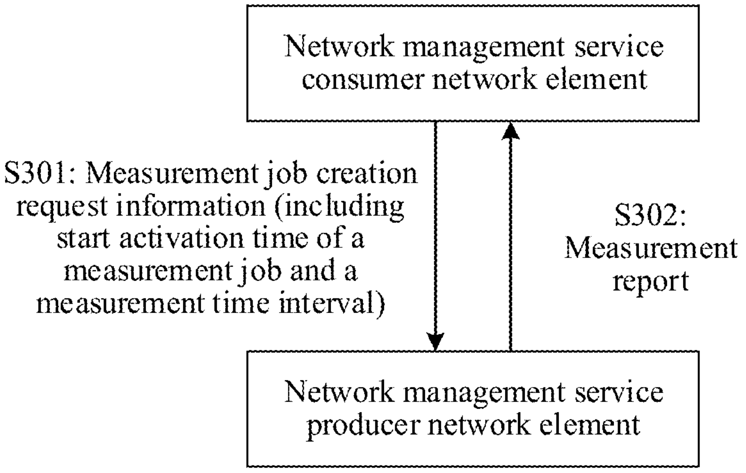
FIG. 3 is a schematic flowchart of data measurement.

FIG. 3 is a schematic flowchart of data measurement. In step S301, a network management service consumer network element may send measurement job creation request information to a network management service producer network element. The request carries a measurement time interval (granularityPeriod) and a start activation moment (startTime) of a measurement job. Main meanings of the two parameters are as follows: granularityPeriod: indicates a time interval between generating two pieces of measurement data. startTime: indicates a start activation moment of a measurement job. If startTime indicates a future moment, the measurement job is activated at startTime. If startTime indicates a past moment, the measurement job is activated immediately.

Usage examples of granularityPeriod and startTime are as follows.

The network management service consumer network element initiates the measurement job creation request information, where a value of granularityPeriod is 5 minutes and a value of startTime is 15:00 on Jun. 7, 2022. After the network management service producer network element creates the measurement job, operations in the following two cases are performed:

Case (1): If the measurement job is created at 14:55 on Jun. 7, 2022, which is earlier than a time point indicated by startTime, the measurement job is activated at 15:00 on Jun. 7, 2022, and measurement data is generated at 15:05, 15:10, 15:15, . . . on Jun. 7, 2022.

Case (2): If the measurement job is created at 15:30 on Jun. 7, 2022, which is later than a time point indicated by startTime, the measurement job is activated immediately (at 15:30 on Jun. 7, 2022), and measurement data is generated at 15:35, 15:40, 15:45, . . . on Jun. 7, 2022.

Step S302: The network management service producer network element sends a measurement report to the network management service consumer network element.

Figure 4:
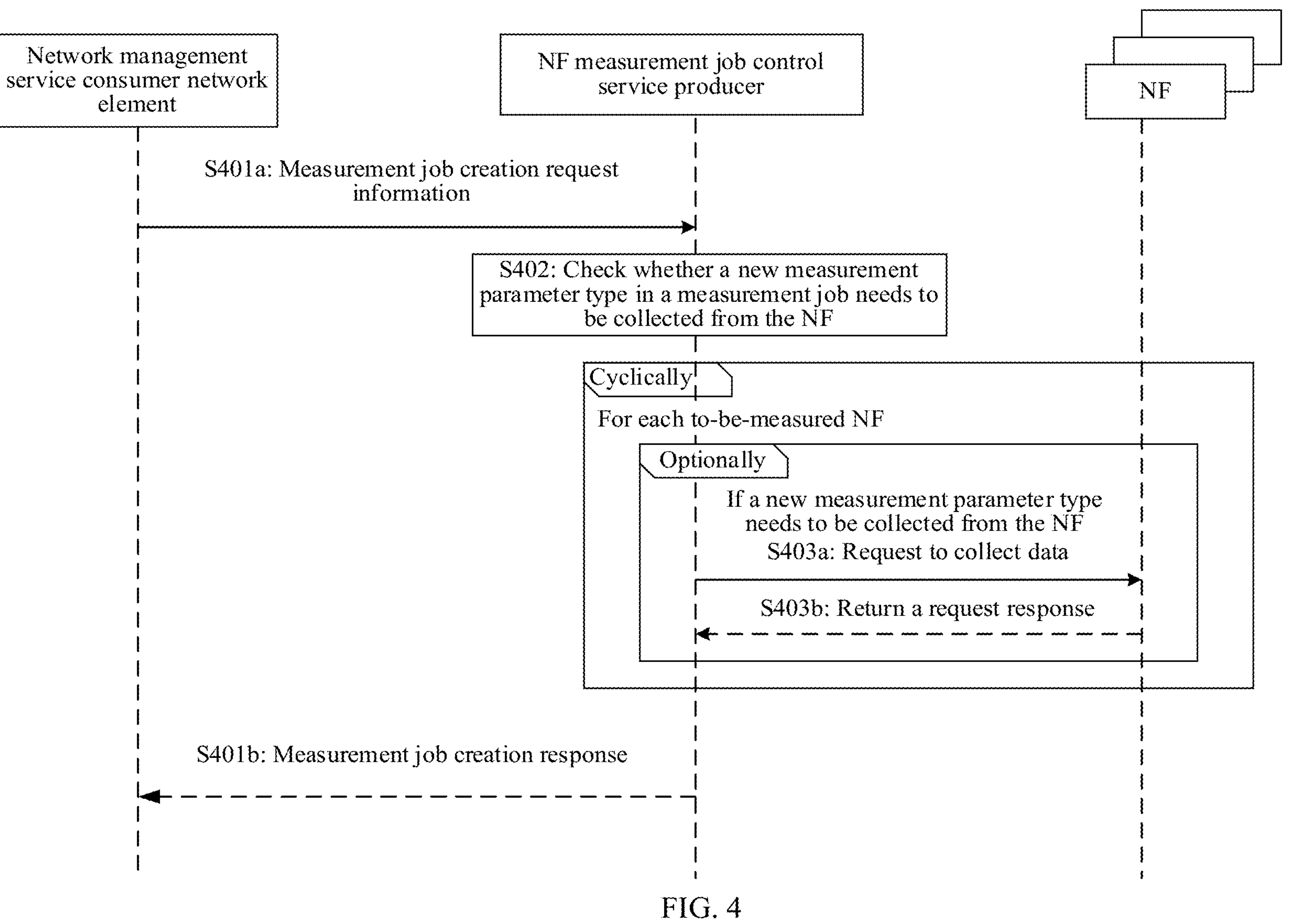
FIG. 4 is an example schematic flowchart of creating a measurement job by a network function.

FIG. 4 is a schematic flowchart of creating a measurement job by an NF. The procedure includes the following steps.

S401*a*: A network management service consumer network element (for example, the network management service consumer network element in the E2E MD) sends measurement job creation request information (CreateMeasurementjob request) to an NF measurement job control service producer, to request to create a measurement job. The request includes startTime and granularityPeriod. The NF measurement job control service producer is a network management service producer network element. The measurement job includes monitoring of a specified network parameter, for example, monitoring of a network parameter such as a bandwidth, a throughput, or a delay.

S402: The NF measurement job control service producer checks whether a new measurement parameter type in the measurement job needs to be collected from the NF.

If a new measurement parameter type needs to be collected from each NF for which the measurement job is specific, the following actions are performed:

S403*a*: The NF measurement job control service producer requests the NF to collect data.

S403*b*: The NF returns a request response to the NF measurement job control service producer.

The returned request response includes data of the new measurement parameter type collected by the NF.

S401*b*: The NF measurement job control service producer returns measurement job creation response information to the network management service consumer network element.

The measurement job creation response information indicates that the measurement job is successfully created.

Measurement job activation: After the measurement job is successfully created, the NF measurement job control service producer compares a moment indicated by startTime with a current moment, and if startTime indicates past time, activates the measurement job immediately and generates measurement data based on a period indicated by granularityPeriod, or otherwise, activates the measurement job at the moment indicated by startTime and generates measurement data based on a period indicated by granularityPeriod.

Figure 5:
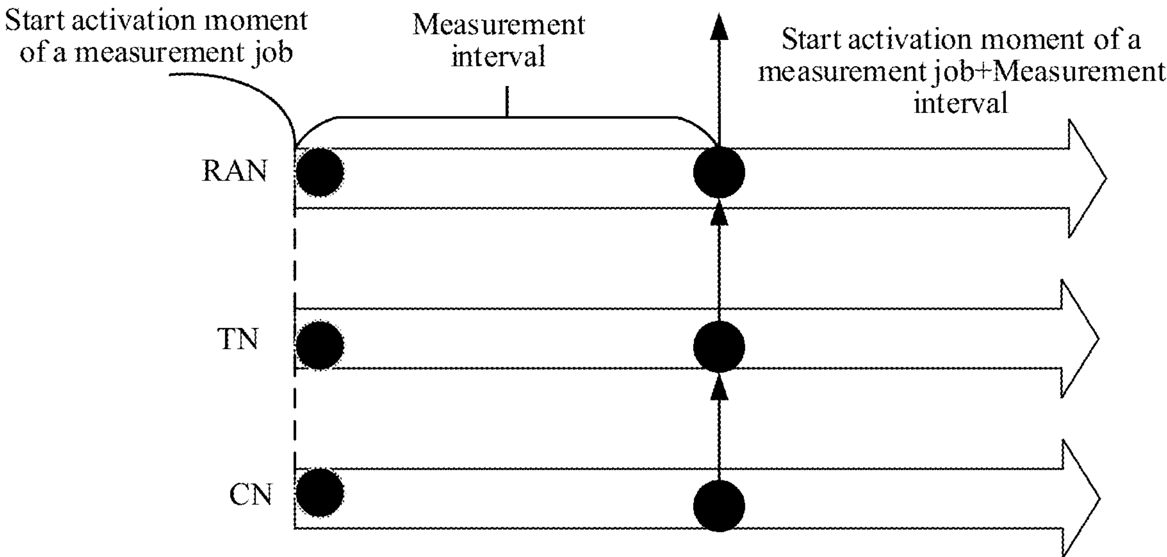
FIG. 5 is a diagram in which time sequences of generating data in domains are aligned in an ideal case.

Using the data management system across network domains shown in FIG. 1 as an example (a principle of a data management system in a single network domain is the same as that of the data management system across network objects), to synchronize data generated in the domains, same startTime and same granularityPeriod may be set in measurement job creation request information of the domains, to ensure that time for generating the data in the domains is the same, and implement time sequence consistency between the data in the domains. FIG. 5 is a diagram in which time sequences of generating data in domains are aligned in an ideal case. Measurement jobs of the domains (RAN/TN/CN MD) are activated at a same moment (start activation moments are the same) and have a same target time interval. In an ideal case, time sequences of generating data in the domains need to be consistent. Correspondingly, in an ideal case, time sequences of reporting data in the domains are consistent.

However, as shown in the measurement job creation procedure in FIG. 4, in a process of creating the measurement job, the NF measurement job control service producer needs to check whether all types of data of the measurement job can be collected. If no connection is established with the NF, a connection needs to be established. When there are a large quantity of NFs, this process may take several hours. Time at which the measurement job is successfully created may be later than startTime. Therefore, there may be the following disadvantages:

Duration of creating measurement jobs of the domains is different and difficult to estimate. If a measurement job of a domain or measurement jobs of some domains are successfully created after startTime, an actual activation moment of the measurement job is later than startTime. A time sequence of measurement data varies with the activation moment of the measurement job, affecting accuracy of digital twin estimation.

Figure 6:
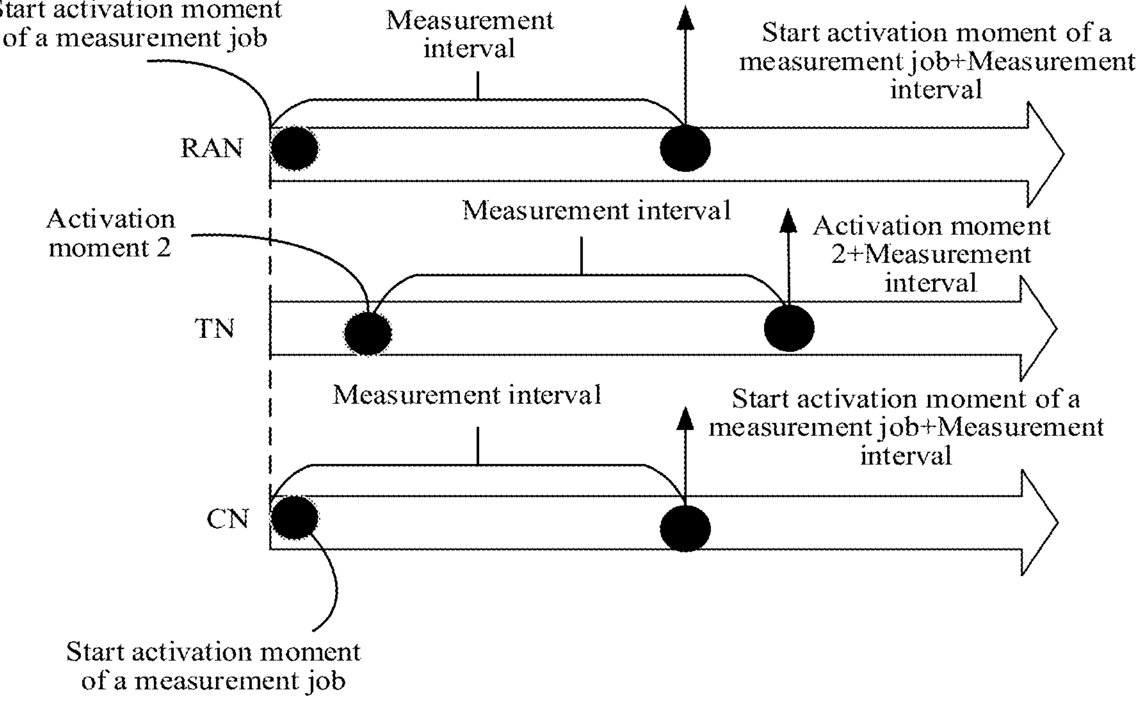
FIG. 6 is an example diagram in which time sequences of generating data in some domains are not aligned in an actual case.

FIG. 6 is an example diagram in which time sequences of generating data in some domains are not aligned in an actual case. An activation moment of a measurement job in a TN domain is later than that in other two domains (started at an activation moment 2). In a same data generation period, a time sequence of generating data in the TN domain is not aligned with time sequences of generating data in the other two domains (RAN/CN).

In this example, a time sequence of generating/reporting data in the TN domain is inconsistent with a time sequence of generating/reporting data in the RAN/CN domain. As a result, the time sequence of generating/reporting data in the TN domain is always inconsistent with the time sequence of generating/reporting data in the RAN/CN domain subsequently. In addition, when a service application in an NMS processes and analyzes data reported in the domains, due to inconsistency between the time sequences of the data, a generated network digital twin is greatly different from an actual network, and an error occurs on processing and analysis results.

For the foregoing problem that duration of creating measurement jobs of network objects is different and difficult to predict, and consequently a moment of obtaining data by some network management service producer network elements is not aligned with a time sequence of obtaining data by another network management service producer network element, this disclosure provides a data management solution. Network management service producer network elements send, to a network management service consumer network element, moments at which measurement data of network objects is obtained for the first time after measurement jobs are activated, where the moment and a first moment sent by the network management service consumer network element are spaced by an integer quantity of target time intervals. The network management service consumer network element creates digital twins based on measurement data of the network objects at a latest moment among the moments at which the network management service producer network elements obtain the measurement data of the network objects for the first time and after the latest moment. Alternatively, the network management service consumer network element indicates the network management service producer network elements not to activate the measurement jobs after the measurement jobs are created, but activate the measurement jobs after the network management service consumer network element uniformly delivers activation request information. In this way, the network management service consumer network element can create, based on measurement data aligned in time sequence, digital twins used to simulate the network objects.

In the following embodiments, a network management service producer network element actively performs time sequence alignment, to resolve a problem that time sequences of data in different domains are not aligned during data collection across network objects.

Figure 7:
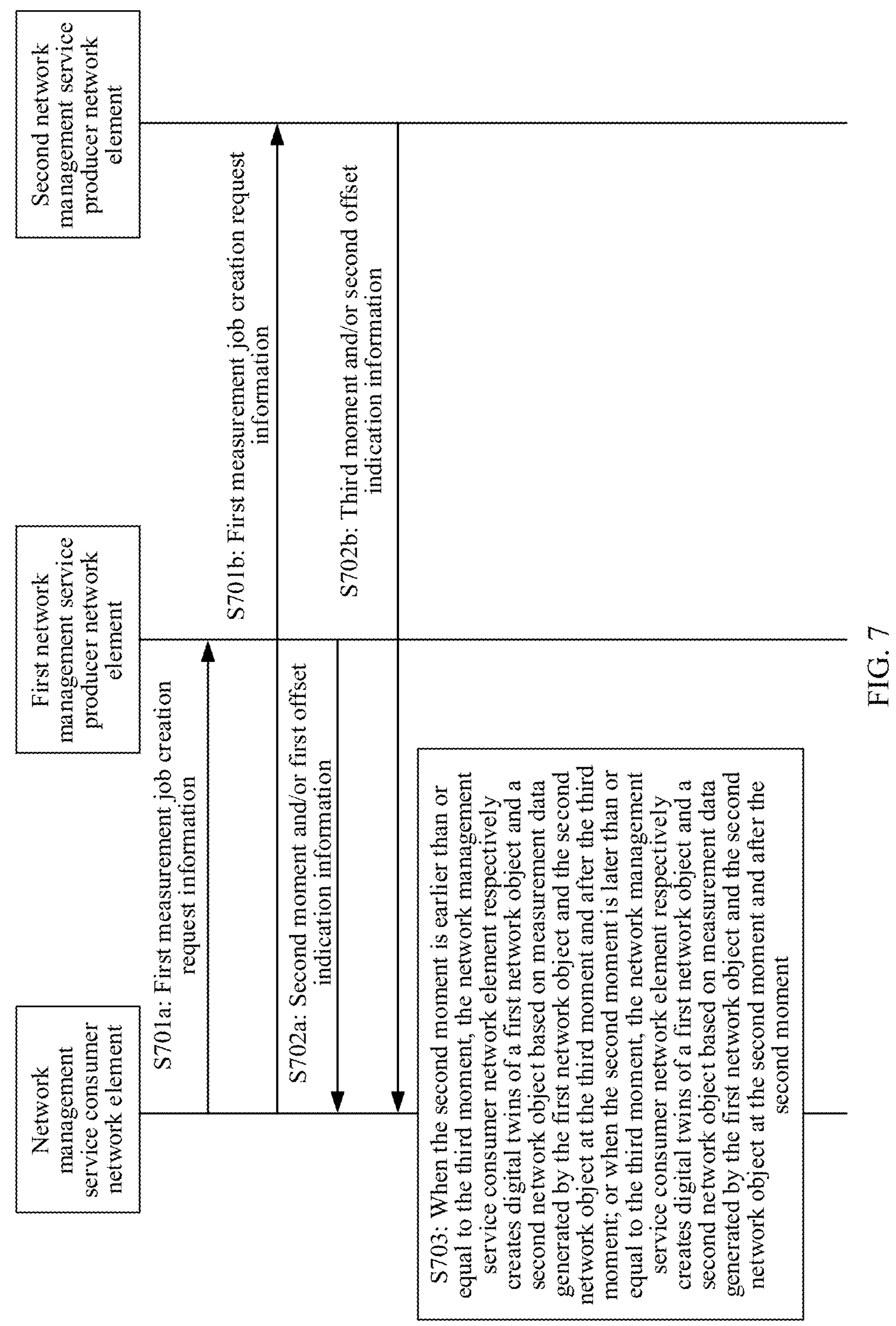
FIG. 7 is a schematic flowchart of a data management method according to an embodiment of this disclosure.

FIG. 7 is a schematic flowchart of a data management method according to an embodiment of this disclosure. For example, the method may include the following steps.

S701*a* and S701*b*: A network management service consumer network element respectively sends first measurement job creation request information and second measurement job creation request information to a first network management service producer network element and a second network management service producer network element. Correspondingly, the first network management service producer network element and the second network management service producer network element respectively receive the first measurement job creation request information and the second measurement job creation request information. The first measurement job creation request information is used to request the first network management service producer network element to activate, at a first moment, a first measurement job used to obtain measurement data of a first network object, and periodically report the measurement data of the first network object to the network management service consumer network element at a target time interval. The second measurement job creation request information is used to request the second network management service producer network element to activate, at the first moment, a second measurement job used to obtain measurement data of a second network object, and periodically report the measurement data of the first network object to the network management service consumer network element at a target time interval. The first and second network objects are not specific, but any one of a plurality of network objects in the foregoing data management system. The first and second measurement job creation request information may include the first moment (that is, the foregoing start activation moment (startTime)) and a target time interval (granularityPeriod).

The first moment is a moment indicated by the network management service consumer network element and at which the measurement jobs of the first network object and the second network object start to be activated. However, whether the first and second network management service producer network elements actually activate the first and second measurement jobs respectively at the first moment depends on whether the first and second network management service producer network elements have created the first and second measurement jobs before the first moment.

The target time interval indicates a time interval between generating two pieces of measurement data.

The first and second measurement jobs each include monitoring of a specified network parameter, for example, monitoring of a network parameter such as a bandwidth, a throughput, or a delay. The measurement data is a detected value corresponding to a network parameter. For example, the detected delay is 10 milliseconds (ms), and the detected throughput is 10 kilobits per second (kbps).

To synchronize data generated by the network objects, a same first moment and a same target time interval may be set in the measurement job creation request information of the network objects (the measurement jobs of the network objects in the data management system correspond to the same first moment, and the measurement jobs of the network objects in the data management system correspond to the same target time interval), so as to ensure that the measurement data of the network objects is obtained at the same time as much as possible, and implement time sequence consistency between the measurement data of the network objects.

However, in an actual case, duration of creating the measurement jobs of the network objects is different and difficult to estimate. When a measurement job of a network object or measurement jobs of some network objects are successfully created after the first moment, in embodiments, a corresponding network management service producer network element may automatically perform time sequence alignment. Automatically performing time sequence alignment means that the first moment and a moment at which the network management service producer network element obtains measurement data of a network object for the first time need to be spaced by an integer quantity of target time intervals when a moment at which a measurement job of the network object is successfully created is later than the first moment.

Further, after receiving the first measurement job creation request information, the first network management service producer network element may create the first measurement job based on the first measurement job creation request information, and after receiving the second measurement job creation request information, the second network management service producer network element may create the second measurement job based on the second measurement job creation request information. Further, the first and second measurement job creation request information may further include types of some parameters for which measurement is requested. The first and second network management service producer network elements may respectively communicate with corresponding NFs based on the types of the parameters for which measurement is requested and that are included in the first and second measurement job creation request information, and indicate the NFs to report the parameters of these types.

S702*a* and S702*b*: The first network management service producer network element sends a second moment and/or first offset indication information to the network management service consumer network element, and the second network management service producer network element sends a third moment and/or second offset indication information to the network management service consumer network element.

Correspondingly, the network management service consumer network element respectively receives the second moment and/or the first offset indication information from the first network management service producer network element and the third moment and/or the second offset indication information from the second network management service producer network element.

In a process of creating the measurement job, it is necessary to check whether all types of parameter data of the measurement job can be collected. If no connection is established with the NF, a connection needs to be established. When there is a large quantity of NFs, this process may take several hours. Time at which the measurement job is successfully created may be later than the first moment. Because the time at which the measurement job of the network object is successfully created is later than the first moment, if the measurement job is activated in another domain at the first moment, data of the network object is not synchronized with that of the other domain.

Therefore, after the measurement job is created and before the measurement job is activated, the first and second network management service producer network elements respectively determine whether current time (that is, the time at which the measurement job is created) is later than the first moment, and if yes, execute an automatic time sequence alignment procedure (an automatic alignment operation).

When determining that the time at which the first network management service producer network element creates the measurement job is later than the first moment, the first network management service producer network element performs time sequence alignment to obtain the second moment. The second moment is a moment at which the measurement data of the first network object is obtained for the first time after the first measurement job is activated, and the second moment and the first moment are spaced by an integer quantity of target time intervals.

After determining the second moment, the first network management service producer network element may send the second moment and/or the first offset indication information to the network management service consumer network element. The first offset indication information indicates that the second moment and the first moment are spaced by an integer quantity of target time intervals.

In addition, if the network object has a plurality of measurement jobs, and the measurement job creation request information is used to request to obtain data of the plurality of measurement jobs, the first network management service producer network element may further send a measurement job identifier, where the measurement job identifier indicates a second moment corresponding to each measurement job.

Further, the first network management service producer network element sends measurement data obtained at the second moment and after the second moment to the network management service consumer network element.

If the second network management service producer network element may activate the second measurement job at the first moment, the second network management service producer network element sends the third moment to the network management service consumer network element. The third moment and the first moment are spaced by one target network interval.

The time at which the second network management service producer network element creates the measurement job may also be later than the first moment. In this case, the second network management service producer network element may determine the third moment with reference to a same manner as the first network management service producer network element. The third moment and the first moment are spaced by an integer (greater than 1) quantity of target network intervals. After determining the third moment, the second network management service producer network element may send the third moment and/or the second offset indication information to the network management service consumer network element. The second offset indication information indicates that the third moment and the first moment are spaced by an integer quantity of target time intervals.

It may be understood that the first network management service producer network element may immediately send the measurement data after obtaining the measurement data for the first time at the second moment, or may send accumulated measurement data after one or more target measurement intervals. Similarly, the first network management service producer network element may immediately send the measurement data after obtaining the measurement data for the first time at the third moment, or may send accumulated measurement data after one or more target measurement intervals.

S703: When the second moment is earlier than or equal to the third moment, the network management service consumer network element respectively creates digital twins of the first network object and the second network object based on measurement data generated by the first network object and the second network object at the third moment and after the third moment, or when the second moment is later than or equal to the third moment, the network management service consumer network element respectively creates digital twins of the first network object and the second network object based on measurement data generated by the first network object and the second network object at the second moment and after the second moment.

In a first case, the time at which the first network management service producer network element creates the measurement job of the network object is later than the first moment, the second network management service producer network element activates the measurement job at the first moment and obtains the measurement data of the second network object for the first time at the third moment (the third moment and the first moment are spaced by one target time interval), and the first network management service producer network element obtains the measurement data of the first network object for the first time at the second moment (the second moment and the first moment are spaced by an integer (greater than 1) quantity of target time intervals). That is, the second moment is later than or equal to the third moment. After receiving the second moment and/or the first offset indication information sent by the first network management service producer network element, and receiving the third moment and/or the second offset indication information sent by the second network management service producer network element, the network management service consumer network element may respectively create the digital twins of the first network object and the second network object based on the measurement data obtained by the first network object and the second network object at the second moment and after the second moment, so as to improve time sequence consistency.

For example, in the first case, the second network management service producer network element sends the measurement data obtained at the third moment (T1) and after the third moment (T2, T3, T4 . . . ), and the first network management service producer network element sends the measurement data obtained at the second moment (T3) and after the second moment (T4, T5, T6 . . . ). In this case, the network management service consumer network element respectively creates the digital twins of the first network object and the second network object based on the measurement data obtained by the first network object and the second network object at T3 and after T3.

Further, the network management service consumer network element may remove data in another domain that is received before the second moment, so that the data is no longer used for the digital twin, or is no longer used for another application.

In a second case, the time at which the first network management service producer network element creates the measurement job of the network object is later than the first moment, an actual activation moment of the second network management service producer network element is later than the first moment and the second network management service producer network element obtains the measurement data of the second network object for the first time at the third moment (the third moment and the first moment are spaced by an integer (greater than 1) quantity of target time intervals), and the first network management service producer network element obtains measurement data of a first target network domain for the first time at the second moment (the second moment and the first moment are spaced by an integer (greater than 1) quantity of target time intervals). That is, the second moment is earlier than or equal to the third moment. After receiving the second moment and/or the first offset indication information sent by the first network management service producer network element, and receiving the third moment and/or the second offset indication information sent by the second network management service producer network element, the network management service consumer network element may respectively create the digital twins of the first network object and the second network object based on the measurement data obtained by the first network object and the second network object at the third moment and after the third moment, so as to improve time sequence consistency.

For example, in the first case, the first network management service producer network element sends the measurement data obtained at the second moment (T1) and after the second moment (T2, T3, T4 . . . ), and the second network management service producer network element sends the measurement data obtained at the third moment (T3) and after the third moment (T4, T5, T6 . . . ). In this case, the network management service consumer network element respectively creates the digital twins of the first network object and the second network object based on the measurement data obtained by the first network object and the second network object at T3 and after T3.

Further, the network management service consumer network element may remove measurement data of another network object that is received before the third moment, so that the data is no longer used for creating the digital twin, or is no longer used for another application.

According to the data management method provided in embodiments of this disclosure, the network management service producer network element sends, to the network management service consumer network element, the second moment at which the measurement data of the network object is generated for the first time after the measurement job is activated, where the second moment and the first moment sent by the network management service consumer network element are spaced by an integer quantity of target time intervals. The network management service consumer network element creates the digital twin based on the data generated in each domain that is received after the second moment. In this way, it can be ensured that the second moment at which the measurement data of the network object is generated for the first time and the first moment indicated by the network management service consumer network element are spaced by an integer quantity of target time intervals, thereby improving time sequence consistency.

Figure 8:
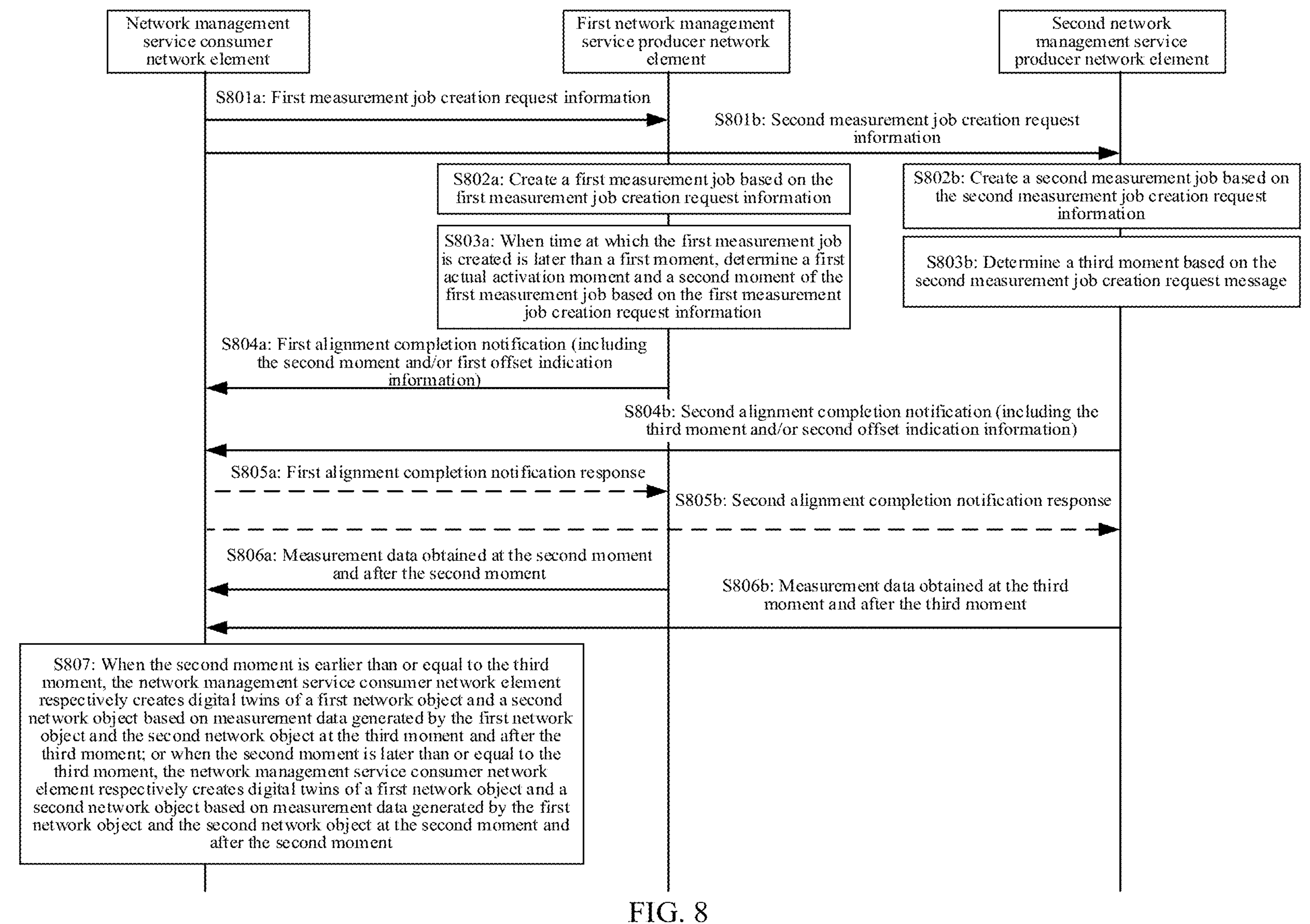
FIG. 8 is a schematic flowchart of another data management method according to an embodiment of this disclosure.

FIG. 8 is a schematic flowchart of another data management method according to an embodiment of this disclosure. For example, the method may include the following steps.

S801*a* and S801*b*: A network management service consumer network element respectively sends first measurement job creation request information and second measurement job creation request information to a first network management service producer network element and a second network management service producer network element.

Correspondingly, the first network management service producer network element and the second network management service producer network element respectively receive the first measurement job creation request information and the second measurement job creation request information.

The first measurement job creation request information is used to request the first network management service producer network element to activate, at a first moment, a first measurement job used to obtain measurement data of a first network object, and periodically report the measurement data of the first network object to the network management service consumer network element at a target time interval. The second measurement job creation request information is used to request the second network management service producer network element to activate, at the first moment, a second measurement job used to obtain measurement data of a second network object, and periodically report the measurement data of the second network object to the network management service consumer network element at a target time interval. The first and second network objects are not specific, but any one of a plurality of network objects in the foregoing data management system. The first measurement job creation request information includes the first moment (startTime), the target time interval (granularityPeriod), and a first time sequence alignment policy. The second measurement job creation request information includes the first moment (startTime), the target time interval (granularityPeriod), and a third time sequence alignment policy.

The first moment is time indicated by the network management service consumer network element and at which the first and second measurement jobs of the first and second network objects start to be activated. However, whether the first and second network management service producer network elements actually activate the first and second measurement jobs at the first moment depends on whether the first and second network management service producer network elements have created the first and second measurement jobs before the first moment.

The target time interval indicates a time interval between generating two pieces of measurement data.

To synchronize data generated by the first and second network objects, a same first moment and a same target time interval may be set in the first and second measurement job creation request information (the first and second measurement jobs correspond to the same first moment, and the first and second measurement jobs correspond to the same target time interval), so as to ensure that the measurement data of the first network object and the second network object is obtained at the same time as much as possible, and implement time sequence consistency between the measurement data of the first network object and the second network object.

However, in an actual case, duration of creating the measurement jobs is different and difficult to estimate. When a measurement job of a network object or measurement jobs of some network objects are successfully created after the first moment, in embodiments, the first and second network management service producer network elements may automatically perform time sequence alignment. Further, in embodiments, the first and second measurement job creation request information includes the first time sequence alignment policy and the third time sequence alignment policy. The first time sequence alignment policy indicates the first network management service producer network element to cause a second moment and the first moment to be spaced by an integer quantity of target time intervals (that is, automatically perform a disorder alignment operation or automatically perform time sequence alignment) when time at which the first measurement job is created is later than the first moment (that is, a disorder occurs). The third time sequence alignment policy indicates the second network management service producer network element to cause a third moment and the first moment to be spaced by an integer quantity of target time intervals (that is, automatically perform a disorder alignment operation or automatically perform time sequence alignment) when time at which the second measurement job is created is later than the first moment (that is, a disorder occurs). The time sequence alignment policy may also be referred to as a time sequence alignment indication, a time sequence alignment method, or the like. A specific name is not limited in embodiments of this disclosure. Automatically performing time sequence alignment means that the first moment and a moment at which the network management service producer network element generates measurement data of a network object for the first time need to be spaced by an integer quantity of target time intervals when a moment at which a measurement job of the network object is successfully created is later than the first moment and the measurement job is activated.

S802*a*: The first network management service producer network element creates the first measurement job based on the first measurement job creation request information.

S802*b*: The second network management service producer network element creates the second measurement job based on the second measurement job creation request information.

After receiving the first and second measurement job creation request information, the first and second network management service producer network elements respectively create the first and second measurement jobs based on the first and second measurement job creation request information. Further, the first and second measurement job creation request information may further include types of some parameters for which measurement is requested. The first and second network management service producer network elements may communicate with corresponding NFs based on the types of the parameters for which measurement is requested and that are included in the first and second measurement job creation request information, and indicate the NEs to report the parameters of these types.

In a process of creating the first measurement job, it is necessary to check whether all data of the first measurement job can be collected. If no connection is established with the NF, a connection needs to be established. When there is a large quantity of NFs, this process may take several hours. Time at which the first measurement job is successfully created may be later than the first moment. Because the time at which the first measurement job of the first network object is created is later than the first moment, if the second network object activates the first measurement job at the first moment, the measurement data of the first network object is not synchronized with that of the second network.

Therefore, after the first and second measurement jobs are created and before the first and second measurement jobs are activated, the first and second network management service producer network elements determine whether current time (that is, the time at which the measurement job is created) is later than the first moment, and if yes, execute an automatic time sequence alignment procedure (an automatic alignment operation).

S803*a*: When the time at which the first network management service producer network element creates the first measurement job is later than the first moment, determine a first actual activation moment and the second moment of the first measurement job based on the first measurement job creation request information.

S803*b*: The second network management service producer network element determines the third moment based on the second measurement job creation request message.

After determining that the time at which the first network management service producer network element creates the first measurement job is later than the first moment, the first network management service producer network element re-determines the first actual activation moment of the first measurement job (that is, an automatically adjusted real moment at which the measurement job is activated) by using the first moment and the target time interval in the first measurement job creation request information. The first actual activation moment and the first moment are spaced by n target time intervals, an interval between the first actual activation moment and the time at which the first measurement job is created is less than one target time interval, and n is a positive integer greater than or equal to 1.

For example, the first actual activation moment of the first measurement job may be set to a minimum future value indicated by startTime+n*granularityPeriod (the future value is less than one target time interval, that is, the interval between the first actual activation moment and the time at which the first measurement job is created is less than one target time interval), and a subsequent data generation period is still granularityPeriod. In this case, time (the second moment) at which the first network object obtains the measurement data for the first time after time sequence alignment is "first actual activation moment+granularityPeriod", that is, the "second moment" of the data obtained by the first network object. That is, the second moment and the first actual activation moment are spaced by one target time interval. It may be understood that the time interval between the first actual activation moment and the first moment is a common divisor of the target time interval.

Figure 9:
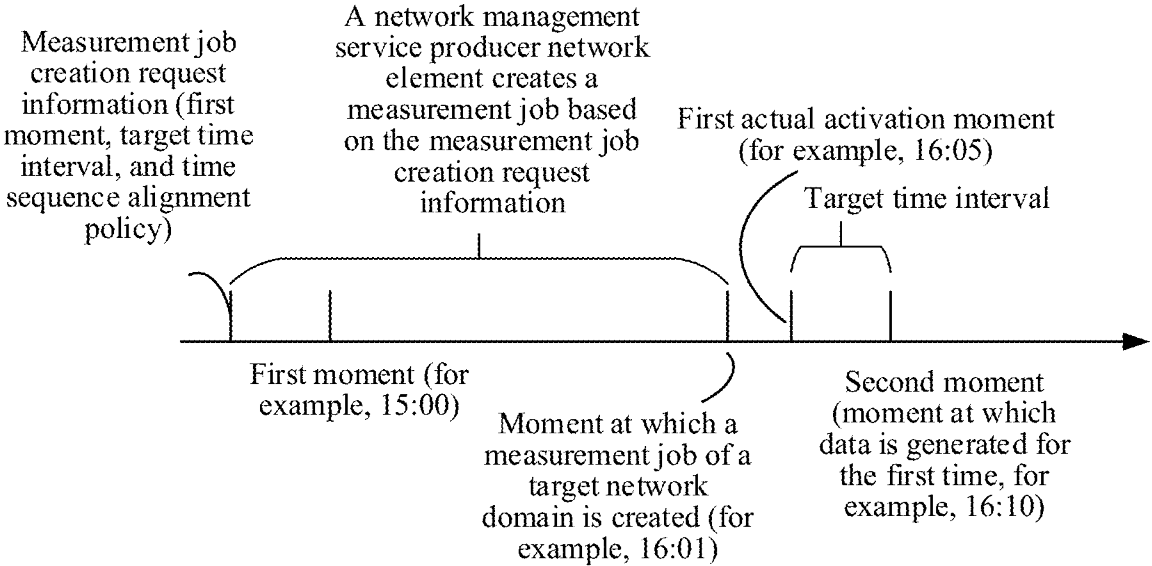
FIG. 9 is a diagram of a data management time sequence according to an embodiment of this disclosure.

For example, as shown in FIG. 9, it is assumed that the first moment is 15:00, the target time interval is 5 minutes, the time at which the first network management service producer network element creates the first measurement job is 16:01, the time at which the first measurement job is created is later than the first moment, the first network management service producer network element re-determines that the first actual activation moment of the first measurement job is 16:05, and the subsequent data generation period is still 5 minutes. In this case, the time at which the measurement data is obtained for the first time is 16:10.

The first network management service producer network element activates the first measurement job of the first network object at the first actual activation moment.

If the second network management service producer network element may activate the second measurement job at the first moment, the second network management service producer network element sends the third moment to the network management service consumer network element. The third moment and the first moment are spaced by one target network interval.

The time at which the second network management service producer network element creates the measurement job may also be later than the first moment. In this case, the second network management service producer network element may determine the third moment with reference to a same manner as the first network management service producer network element. The third moment and the first moment are spaced by an integer (greater than 1) quantity of target network intervals.

S804*a*: The first network management service producer network element sends a first alignment completion notification to the network management service consumer network element.

Correspondingly, the network management service consumer network element receives the first alignment completion notification.

S804*b*: The second network management service producer network element sends a second alignment completion notification to the network management service consumer network element.

Correspondingly, the network management service consumer network element receives the second alignment completion notification.

The first network management service producer network element may send the first alignment completion notification to the network management service consumer network element after determining the second moment. The first alignment completion notification includes the second moment and/or first offset indication information. In addition, if the first network object has a plurality of first measurement jobs, the first alignment completion notification may further include a measurement job identifier, and the measurement job identifier indicates a second moment corresponding to each first measurement job.

The second network management service producer network element may send the second alignment completion notification to the network management service consumer network element after determining the third moment. The second alignment completion notification includes the third moment and/or second offset indication information.

S805*a*: The network management service consumer network element sends a first alignment completion notification response to the first network management service producer network element.

S805*b*: The network management service consumer network element sends a second alignment completion notification response to the second network management service producer network element.

The network management service consumer network element respectively sends the first and second alignment completion notification responses to the first and second network management service producer network elements, to indicate that the first and second alignment completion notifications have been received.

Alternatively, after receiving the first and second alignment completion notifications, the network management service consumer network element may not send the first and second alignment completion notification responses to the first and second network management service producer network elements, and the first and second network management service producer network elements consider by default that the network management service consumer network element receives the first and second alignment completion notifications. Therefore, this step is optional, and is represented by a dashed line in the figure.

S806*a*: The first network management service producer network element sends measurement data obtained at the second moment and after the second moment to the network management service consumer network element.

S806*b*: The second network management service producer network element sends measurement data obtained at the third moment and after the third moment to the network management service consumer network element.

S807: When the second moment is earlier than or equal to the third moment, the network management service consumer network element respectively creates digital twins of the first network object and the second network object based on measurement data generated by the first network object and the second network object at the third moment and after the third moment, or when the second moment is later than or equal to the third moment, the network management service consumer network element respectively creates digital twins of the first network object and the second network object based on measurement data generated by the first network object and the second network object at the second moment and after the second moment.

For specific implementation of this step, refer to step S703 in the foregoing embodiment. Details are not described herein again.

According to the data management method provided in embodiments of this disclosure, the first time sequence alignment policy is carried in the measurement job creation request information, to indicate the network management service producer network element to automatically perform time sequence alignment when a disorder occurs, and send the alignment completion notification to the network management service consumer network element after the time sequence alignment. After receiving the alignment completion notification, the network management service consumer network element creates the digital twin based on the measurement data that is generated by the network object and that is received after the second moment, so as to ensure that the second moment at which the measurement data of the network object is generated for the first time and the first moment indicated by the network management service consumer network element are spaced by an integer quantity of target time intervals, thereby improving time sequence consistency.

Figure 10:
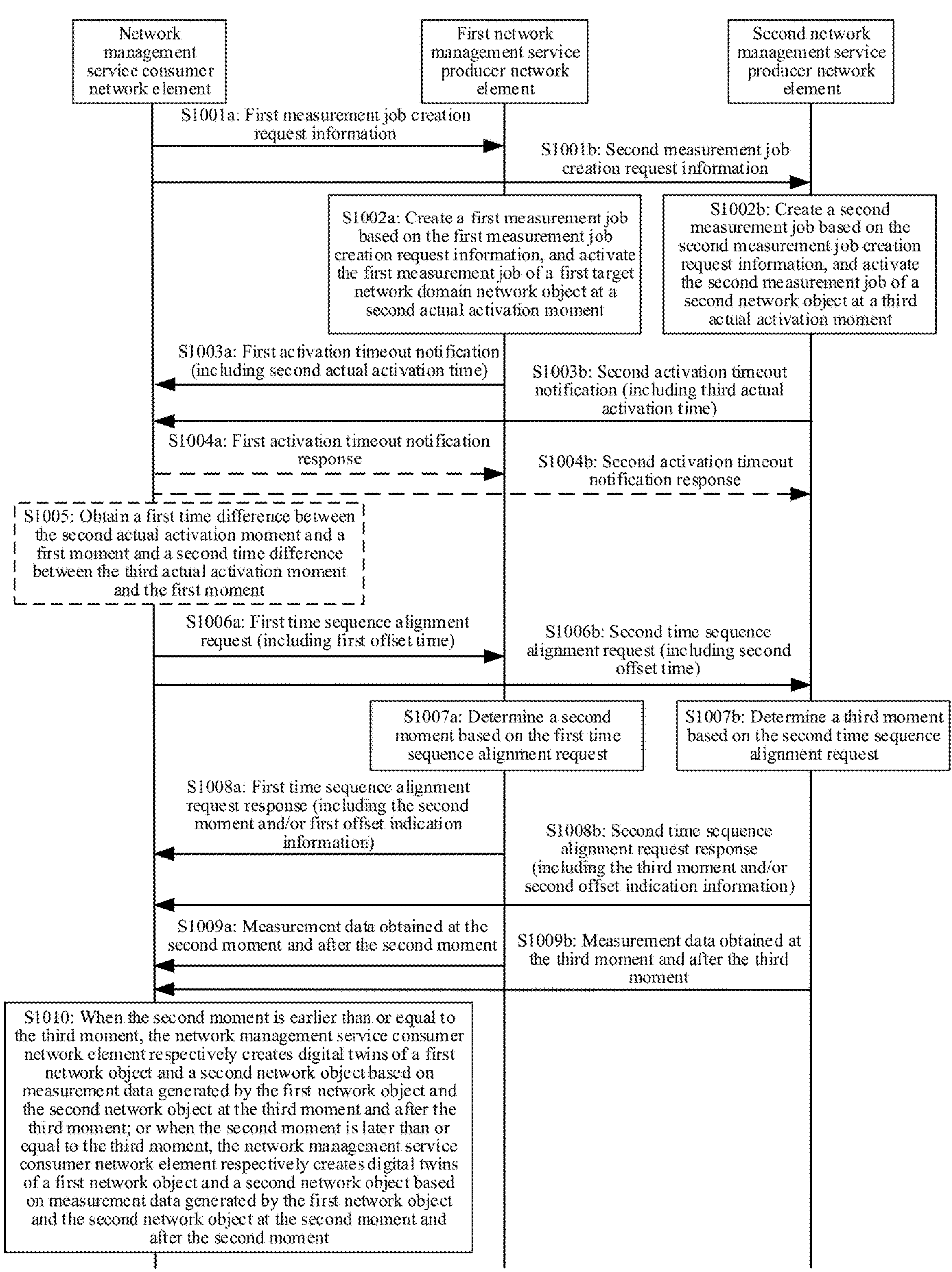
FIG. 10 is a schematic flowchart of still another data management method according to an embodiment of this disclosure.

FIG. 10 is a schematic flowchart of still another data management method according to an embodiment of this disclosure. For example, the method may include the following steps.

S1001*a* and S1001*b*: A network management service consumer network element respectively sends first measurement job creation request information and second measurement job creation request information to a first network management service producer network element and a second network management service producer network element.

Correspondingly, the first network management service producer network element and the second network management service producer network element respectively receive the first measurement job creation request information and the second measurement job creation request information.

The first measurement job creation request information is used to request the first network management service producer network element to activate, at a first moment, a first measurement job used to obtain measurement data of a first network object, and periodically report the measurement data of the first network object to the network management service consumer network element at a target time interval. The second measurement job creation request information is used to request the second network management service producer network element to activate, at the first moment, a second measurement job used to obtain measurement data of a second network object, and periodically report the measurement data of the second network object to the network management service consumer network element at a target time interval. The first and second network objects are not specific, but any one of a plurality of network objects in the foregoing data management system. The first measurement job creation request information includes the first moment (startTime), the target time interval (granularityPeriod), and a second time sequence alignment policy. The second measurement job creation request information includes the first moment (startTime), the target time interval (granularityPeriod), and a fourth time sequence alignment policy.

The first moment is time indicated by the network management service consumer network element and at which the measurement jobs of the first and second network objects start to be activated. However, whether the first and second network management service producer network elements activate the measurement jobs at the first moment depends on a specific case.

The target time interval indicates a time interval between generating two pieces of measurement data.

To synchronize data obtained by the first network object and the second network object, a same first moment and a same target time interval may be set in the first and second measurement job creation request information (the first and second measurement jobs correspond to the same first moment, and the first and second measurement jobs correspond to the same target time interval), so as to ensure that the measurement data of the first network object and the second network is obtained at the same time as much as possible, and implement time sequence consistency between the measurement data obtained by the first network object and the second network.

However, in an actual case, duration of creating the first and second measurement jobs is different and difficult to estimate. When a measurement job of a network object or measurement jobs of some network objects are successfully created after the first moment, in embodiments, the first and second network management service producer network elements may automatically perform time sequence alignment. Further, in embodiments, the first measurement job creation request information in embodiments further includes the second time sequence alignment policy, and the second time sequence alignment policy indicates the first network management service producer network element to report a second actual activation moment of the measurement job when the time at which the measurement job is created is later than the first moment (that is, a disorder occurs). The second measurement job creation request information further includes the fourth time sequence alignment policy, and the fourth time sequence alignment policy indicates the second network management service producer network element to report a fourth actual activation moment of the measurement job when the time at which the measurement job is created is later than the first moment (that is, a disorder occurs). Automatically performing time sequence alignment means that the first moment and a moment at which the network management service producer network element obtains measurement data of a network object for the first time need to be spaced by an integer quantity of target time intervals when a moment at which a measurement job of the network object is successfully created is later than the first moment and the measurement job is activated.

S1002*a*: The first network management service producer network element creates the first measurement job based on the first measurement job creation request information, and activates the first measurement job of the first network object at the second actual activation moment.

S1002*b*: The second network management service producer network element creates the second measurement job based on the second measurement job creation request information, and activates the second measurement job of the second network object at the third actual activation moment.

After receiving the first measurement job creation request information, the first network management service producer network elements creates the first measurement job based on the first measurement job creation request information. Further, the first measurement job creation request information may further include types of some parameters for which measurement is requested. The first network management service producer network element may communicate with a corresponding NF based on the types of the parameters for which measurement is requested and that are included in the first measurement job creation request information, and indicate the NF to report the parameters of these types.

In a process of creating the first measurement job, it is necessary to check whether all data of the first measurement job can be collected. If no connection is established with the NF, a connection needs to be established. When there are a large quantity of NFs, this process may take several hours. After creating the measurement job, the first network management service producer network element activates the first measurement job. Time at which the first measurement job is activated is the second actual activation moment. The second actual activation moment is later than the first moment.

S1003*a*: The first network management service producer network element sends a first activation timeout notification to the network management service consumer network element. The first activation timeout notification includes the second actual activation moment.

S1003*b*: The second network management service producer network element sends a second activation timeout notification to the network management service consumer network element. The second activation timeout notification includes the third actual activation moment.

Because the network management service producer network element actually activates the measurement job of the network object at the second actual activation moment, which is later than the first moment, if the measurement job is activated in another domain at the first moment, data of the network object is not synchronized with that of the other domain. Therefore, the network management service producer network element sends the activation timeout notification to the network management service consumer network element. The activation timeout notification includes the second actual activation moment.

In addition, if the network object has a plurality of measurement jobs, the activation timeout notification may further include a measurement job identifier, and the measurement job identifier indicates a measurement job for which activation times out.

Alternatively, the network management service producer network element may send measurement job creation response information to the network management service consumer network element, and the second actual activation moment and the measurement job identifier may be carried in the measurement job creation response information.

If the second network management service producer network element may activate the second measurement job at the first moment, the second network management service producer network element does not send the activation timeout notification to the network management service consumer network element.

The time at which the second network management service producer network element creates the measurement job may also be later than the first moment. In this case, the second network management service producer network element may determine the third moment with reference to a same manner as the first network management service producer network element. The third moment and the first moment are spaced by an integer (greater than 1) quantity of target network intervals. The second network management service producer network element sends a second activation timeout notification to the network management service consumer network element. The second activation timeout notification includes the third actual activation moment.

S1004*a*: The network management service consumer network element sends a first activation timeout notification response to the first network management service producer network element.

S1004*b*: The network management service consumer network element sends a second activation timeout notification response to the second network management service producer network element.

The first and second activation timeout notification responses indicate that the network management consumer network element receives the first and second activation timeout notifications.

Alternatively, the network management service producer network element may consider by default that the network management service consumer network element receives the activation timeout notification, and the network management service consumer network element may not send the activation timeout notification response to the network management service producer network element. Therefore, this step is optional, and is represented by a dashed line in the figure.

S1005: The network management service consumer network element obtains a first time difference between the second actual activation moment and the first moment and a second time difference between the third actual activation moment and the first moment.

After receiving the first activation timeout notification, the network management service consumer network element obtains the second actual activation moment included in the first activation timeout notification, compares the second actual activation moment with the first moment, and obtains the first time difference between the second actual activation moment and the first moment.

If the first time difference between the second actual activation moment and the first moment is less than or equal to a specified threshold, it indicates that a disorder of the first network object is tolerable, and the network management service consumer network element may not perform a subsequent operation.

If the first time difference between the second actual activation moment and the first moment is greater than or equal to the specified threshold, it indicates that the disorder of the first network object is intolerable, and the network management service consumer network element may perform a subsequent operation.

For example, if the first time difference between the second actual activation moment and the first moment is equal to the specified threshold, it may be considered that the disorder of the first network object is tolerable, or it may be considered that the disorder of the first network object is intolerable. One of the cases may be selected in a specific implementation process.

In addition, the network management service consumer network element may not obtain the first time difference between the second actual activation moment and the first moment or compare the time difference with the specified threshold, but perform a subsequent operation when the second actual activation moment is later than the first moment. Therefore, this step is optional, and is represented by a dashed line in the figure.

Similarly, the network management service consumer network element may obtain the second time difference between the third actual activation moment and the first moment.

S1006*a*: The network management service consumer network element sends a first time sequence alignment request to the first network management service producer network element, where the first time sequence alignment request includes first offset time.

S1006*b*: The network management service consumer network element sends a second time sequence alignment request to the second network management service producer network element, where the second time sequence alignment request includes second offset time.

After receiving the first activation timeout notification, the network management service consumer network element learns that the activation of the first measurement job of the first network object times out, and needs to perform time sequence alignment with the measurement data of the second measurement job. The time sequence alignment is time sequence alignment starting from the second actual activation moment. The network management service consumer network element determines the first offset time for time sequence alignment based on the second actual activation moment carried in the first activation timeout notification. The first network management service consumer network element sends the first time sequence alignment request to the network management service producer network element, where the first time sequence alignment request includes the first offset time.

For example, if the first time difference between the second actual activation moment and the first moment is greater than or equal to the specified threshold, that is, the disorder is intolerable, the network management service consumer network element sends the first time sequence alignment request to the first network management service producer network element.

Figure 11:
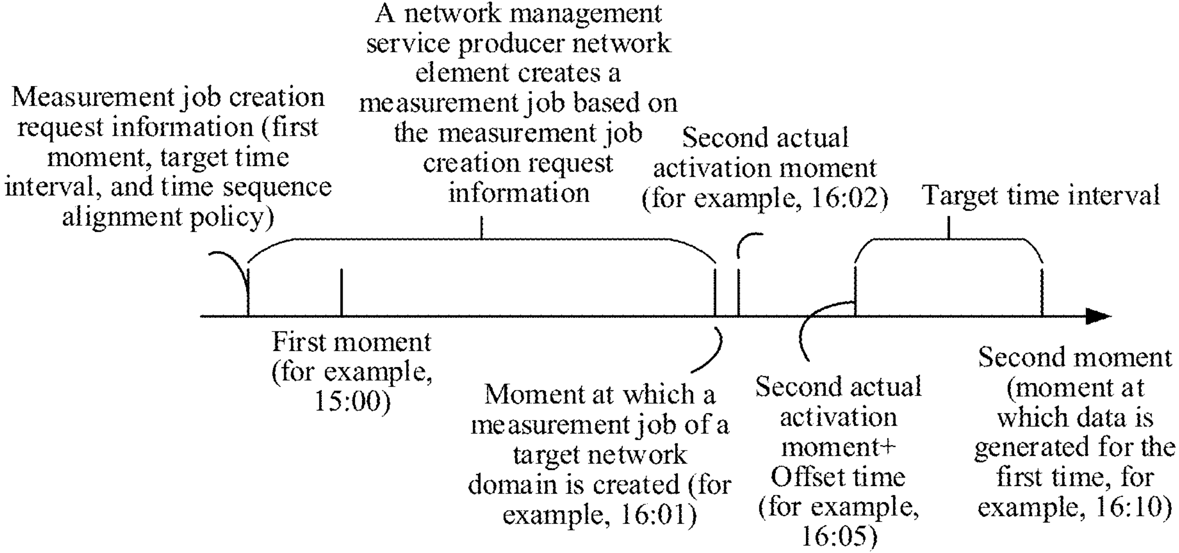
FIG. 11 is a diagram of another data management time sequence according to an embodiment of this disclosure.

For example, as shown in FIG. 11, it is assumed that the first moment is 15:00, the target time interval is 5 minutes, the time at which the first network management service producer network element creates the first measurement job is 16:01, and the first network management service producer network element activates the first measurement job at 16:02, that is, the second actual activation moment is 16:02. In this case, the network management service consumer network element determines that the first offset time is 3 minutes.

In addition, if the first network object has a plurality of measurement jobs, the first time sequence alignment request may further include a measurement job identifier, and the measurement job identifier indicates a measurement job on which time sequence alignment is to be performed.

Similarly, the network management service consumer network element determines the second offset time, and sends the second time sequence alignment request to the second network management service producer network element, where the second time sequence alignment request includes the second offset time.

S1007*a*: The first network management service producer network element determines a second moment based on the first time sequence alignment request.

S1007*b*: The second network management service producer network element determines the third moment based on the second time sequence alignment request.

After receiving the first time sequence alignment request, the first network management service producer network element obtains the first offset time carried in the first time sequence alignment request, and determines the second moment based on the first offset time and the target time interval. The second moment and the second actual activation moment are spaced by one target time interval and the first offset time.

After receiving the second time sequence alignment request, the second network management service producer network element obtains the second offset time carried in the second time sequence alignment request, and determines the third moment based on the second offset time and the target time interval. The third moment and the third actual activation moment are spaced by one target time interval and the second offset time.

In this case, in the foregoing example, the second moment is 16:10.

The time at which the second network object obtains the measurement data is 15:00, 15:05, . . . , 16:00, 16:05, 16:10, . . . . Therefore, the time sequence of obtaining data by the first network object can be aligned with the time sequence of obtaining data by the second network object.

S1008*a*: The first network management service producer network element sends a first time sequence alignment response to the network management service consumer network element.

S1008*b*: The second network management service producer network element sends a second time sequence alignment response to the network management service consumer network element.

The first and second time sequence alignment responses respectively indicate that the first and second network management service producer network elements have executed the second and fourth time sequence alignment policies and performed time sequence alignment. The first time sequence alignment response includes the second moment and/or first offset indication information, and the first offset indication information indicates that the second moment and the first moment are spaced by an integer quantity of target time intervals. The second time sequence alignment response includes the third moment and/or second offset indication information, and the second offset indication information indicates that the third moment and the first moment are spaced by an integer quantity of target time intervals.

In addition, if the network object has a plurality of measurement jobs, the time sequence alignment response may further include a measurement job identifier, and the measurement job identifier indicates a measurement job on which time sequence alignment has been performed.

S1009*a*: The first network management service producer network element sends measurement data obtained at the second moment and after the second moment to the network management service consumer network element.

S1009*b*: The second network management service producer network element sends measurement data obtained at the third moment and after the third moment to the network management service consumer network element.

S1010: When the second moment is earlier than or equal to the third moment, the network management service consumer network element respectively creates digital twins of the first network object and the second network object based on measurement data generated by the first network object and the second network object at the third moment and after the third moment, or when the second moment is later than or equal to the third moment, the network management service consumer network element respectively creates digital twins of the first network object and the second network object based on measurement data generated by the first network object and the second network object at the second moment and after the second moment.

For specific implementation of this step, refer to step S703 in the foregoing embodiment. Details are not described herein again.

According to the data management method provided in embodiments of this disclosure, the time sequence alignment policy is carried in the measurement job creation request information, to indicate the network management service producer network element to actively report a disorder when the disorder occurs, wait for the time sequence alignment request of the network management service consumer network element, and send the time sequence alignment response to the network management service consumer network element after the time sequence alignment. After receiving the time sequence alignment response, the network management service consumer network element creates the digital twin based on the measurement data that is generated by the network object and that is received after the second moment, so as to ensure that the second moment at which the measurement data of the network object is generated for the first time and the first moment indicated by the network management service consumer network element are spaced by an integer quantity of target time intervals, thereby improving time sequence consistency.

In the foregoing embodiments, the network management service producer network element actively initiates a time sequence alignment procedure, to resolve a problem that time sequences of data in different domains are not aligned during data collection across network objects. Alternatively, the network management service producer network element may passively initiate a time sequence alignment procedure, to resolve a problem that time sequences of data in different domains are not aligned during data collection across network objects. Details are described in the following embodiments.

Figure 12:
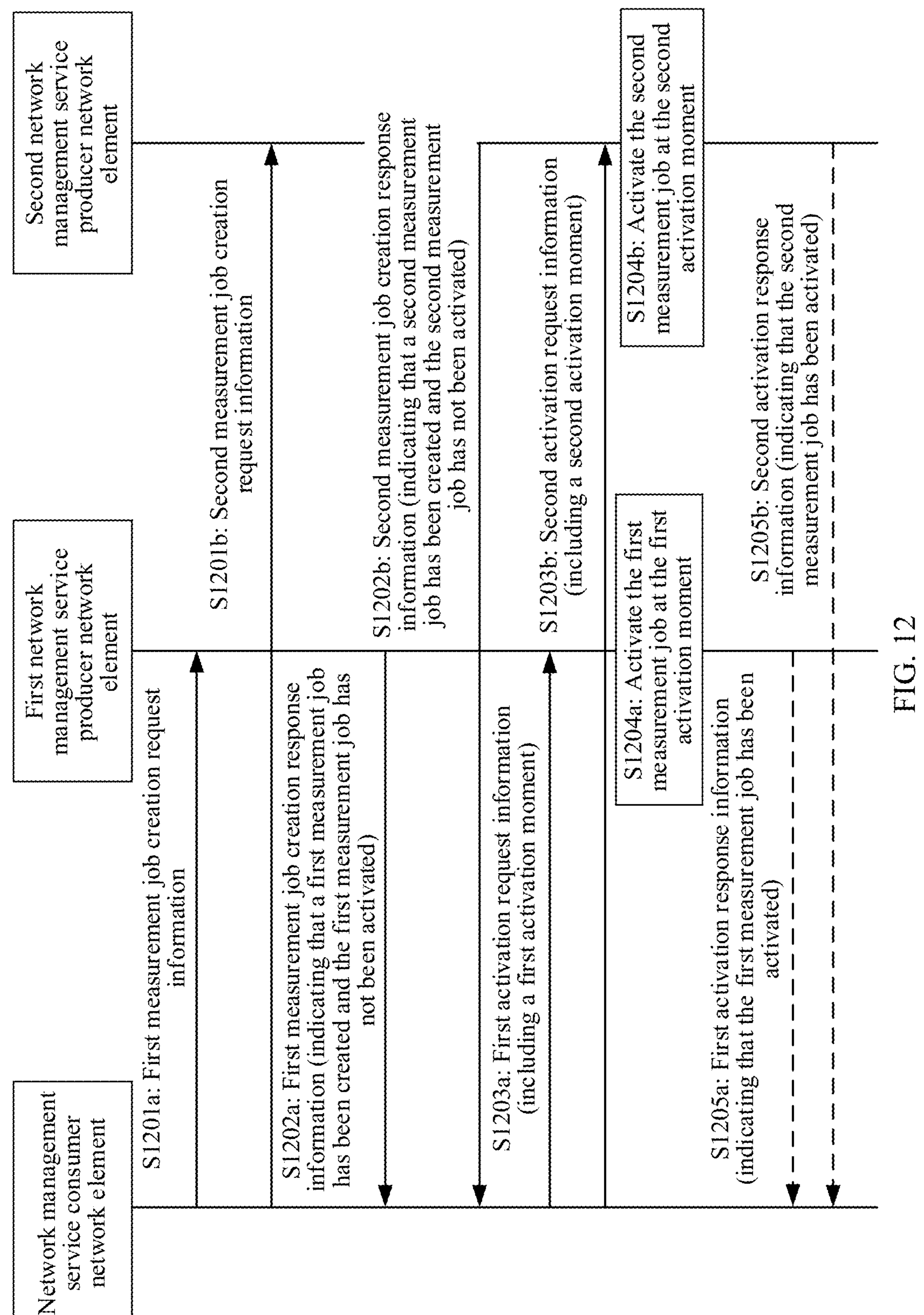
FIG. 12 is a schematic flowchart of still another data management method according to an embodiment of this disclosure.

FIG. 12 is a schematic flowchart of still another data management method according to an embodiment of this disclosure. For example, the method may include the following steps.

S1201*a* and S1201*b*: A network management service consumer network element respectively sends first measurement job creation request information and second measurement job creation request information to a first network management service producer network element and a second network management service producer network element.

Correspondingly, the first network management service producer network element receives the first measurement job creation request information, and the second network management service producer network element receives the second measurement job creation request information.

The first measurement job creation request information is used to request the first network management service producer network element of a first network object to create a first measurement job. The second measurement job creation request information is used to request the second network management service producer network element of a second network object to create a second measurement job. The first and second network objects are not specific, but any one of a plurality of network objects in the foregoing data management system.

To synchronize data obtained by the first network object and the second network object, a same first moment and a same target time interval may be set in the first and second measurement job creation request information (the first and second measurement jobs correspond to the same first moment, and the first and second measurement jobs correspond to the same target time interval), so as to ensure that the measurement data of the first network object and the second network is obtained at the same time as much as possible, and implement time sequence consistency between the measurement data obtained by the first network object and the second network.

However, in an actual case, duration of creating the first and second measurement jobs is different and difficult to estimate. When a measurement job of a network object or measurement jobs of some network objects are successfully created after the first moment, in embodiments, the network management service consumer network element may respectively indicate the first network management service producer network element and the second network management service producer network element to only create the first and second measurement jobs, without activating the first and second measurement jobs, and to wait for the first and second measurement jobs to be activated. For example, the first and second measurement job creation request information respectively include first and second time sequence alignment indications. The first and second time sequence alignment indications respectively indicate the first and second network management service producer network elements to wait for the first and second measurement jobs to be activated.

Further, the first and second network management service producer network elements respectively create the first and second measurement jobs of the first and second network objects based on the first and second measurement job creation request information.

After receiving the first and second measurement job creation request information, the first and second network management service producer network elements respectively create the first and second measurement jobs based on the first and second measurement job creation request information. Further, the first and second measurement job creation request information may further include types of some parameters for which measurement is requested. The first and second network management service producer network elements may communicate with corresponding NFs based on the types of the parameters for which measurement is requested and that are included in the first and second measurement job creation request information, and indicate the NFs to report the parameters of these types.

In a process of creating the first measurement job, it is necessary to check whether all data of the first measurement job can be collected. If no connection is established with the NF, a connection needs to be established. When there is a large quantity of NFs, this process may take several hours. Time at which the first measurement job is successfully created may be later than the first moment. Because the time at which the first measurement job of the first network object is created is later than the first moment, if the second network object activates the first measurement job at the first moment, the data obtained by the first network object is not synchronized with that of the second network.

After creating the first and second measurement jobs of the first and second network objects based on the first and second measurement job creation request information, the first and second network management service producer network elements do not activate the first and second measurement jobs immediately.

S1202*a* and S1202*b*: The first network management service producer network element and the second network management service producer network element respectively send first measurement job creation response information and second measurement job creation response information to the network management service consumer network element.

Correspondingly, the network management service consumer network element receives the first and second measurement job creation response information.

After creating the measurement jobs of the network objects, the first and second network management service producer network elements do not activate the first and second measurement jobs, and send the first and second measurement job creation response information to the network management service consumer network element. The first and second measurement job creation response information indicate that the first and second measurement jobs of the first and second network objects have been created, and the first and second measurement jobs of the first and second network objects have not been activated.

The network management service consumer network element receives the first and second measurement job creation response information respectively sent by the first and second network management service producer network elements, and time at which the first and second network management service producer network elements create the first and second measurement jobs may be the same or different. Therefore, the network management service consumer network element may receive the first and second measurement job creation response information at the same time or at different time.

S1203*a* and S1203*b*: The network management service consumer network element respectively sends first activation request information and second activation request information to the first network management service producer network element and the second network management service producer network element.

Correspondingly, the first and second network management service producer network elements respectively receive the first and second activation request information.

After receiving the first and second measurement job creation response information, the network management service consumer network element respectively sends the first and second activation request information to the first and second network management service producer network elements. The first and second activation request information respectively include activation moments of the first and second measurement jobs, and the activation moment of the first measurement job is consistent with the activation moment of the second measurement job.

After the network management service consumer network element receives the first and second measurement job creation response information, the network management service consumer network element uniformly initiates the first and second activation request information, so that time sequences of activating the measurement jobs and obtaining the data by the network management service producer network elements can be consistent.

S1204*a* and S1204*b*: The first network management service producer network element and the second network management service producer network element respectively activate the first measurement job of the first network object and the second measurement job of the second network object at the activation moments.

After receiving the first and second activation request information respectively sent by the network management service consumer network element, the first and second network management service producer network element activates the first and second measurement jobs of the first and second network objects at the activation moments based on the activation moments of the first and second measurement jobs in the first and second activation request information.

Optionally, the method may include the following steps (represented by dashed lines in the figure):

S1205*a* and S1205*b*: The first network management service producer network element and the second network management service producer network element respectively send first activation response information and second activation response information to the network management service consumer network element.

Correspondingly, the network management service consumer network element receives the first and second activation response information.

The first and second activation response information respectively indicate that the first and second measurement jobs of the first and second network objects have been activated.

According to the data management method provided in embodiments of this disclosure, the network management service consumer network element indicates the network management service producer network elements not to activate the measurement jobs after the measurement jobs are created, but activate the measurement jobs after the network management service consumer network element uniformly delivers the activation request information. In this way, time sequence consistency between data reported by different network elements or domains can be improved, and data synchronization can be implemented.

It may be understood that, in the foregoing embodiments, the method and/or the step implemented by the network management service producer network element may also be implemented by a component (for example, a chip or a circuit) that may be used in the network management service producer network element, and the method and/or the step implemented by the network management service consumer network element may also be implemented by a component (for example, a chip or a circuit) that may be used in the network management service consumer network element.

The foregoing mainly describes the solutions provided in embodiments of this disclosure from a perspective of interaction between network elements. Correspondingly, embodiments of this disclosure further provide a data management apparatus. The data management apparatus is configured to implement the foregoing methods. The data management apparatus may be the network management service producer network element or a component that can be used in the network management service producer network element in the foregoing method embodiment, or the data management apparatus may be the network management service consumer network element or a component that can be used in the network management service consumer network element in the foregoing method embodiment. It can be understood that, to implement the foregoing functions, the data management apparatus includes a corresponding hardware structure and/or software module for performing the functions. A person skilled in the art should easily be aware that, in combination with units and algorithm steps of the examples described in embodiments disclosed in this specification, this disclosure may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this disclosure.

In embodiments of this disclosure, the data management apparatus may be divided into functional modules based on the foregoing method embodiments. For example, each functional module may be obtained through division based on each corresponding function, or two or more functions may be integrated into one processing module. The integrated module may be implemented in a form of hardware, or may be implemented in a form of a software functional module. It should be noted that, in embodiments of this disclosure, division into modules is an example, and is merely a logical function division. In actual implementation, another division manner may be used.

Based on a same concept of the foregoing data management method, this disclosure further provides the following data management apparatus.

Figure 13:
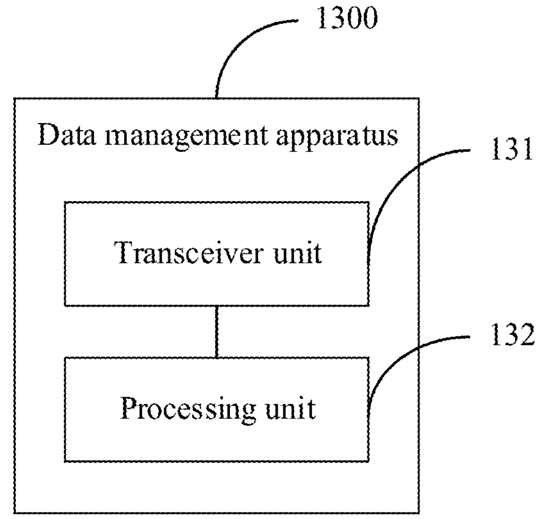
FIG. 13 is a diagram of a structure of a data management apparatus according to an embodiment of this disclosure.

FIG. 13 is a diagram of a structure of a data management apparatus according to an embodiment of this disclosure. The data management apparatus 1300 includes a transceiver unit 131 and a processing unit 132.

When the data management apparatus 1300 is configured to implement the function of the network management service consumer network element in the method embodiment shown in FIG. 7, FIG. 8, or FIG. 10, the transceiver unit 131 is configured to respectively send first measurement job creation request information and second measurement job creation request information to a first network management service producer network element and a second network management service producer network element, where the first measurement job creation request information is used to request the first network management service producer network element to activate, at a first moment, a first measurement job used to obtain measurement data of a first network object, and periodically report the measurement data of the first network object to the network management service consumer network element at a target time interval, and the second measurement job creation request information is used to request the second network management service producer network element to activate, at the first moment, a second measurement job used to obtain measurement data of a second network object, and periodically report the measurement data of the second network object to the network management service consumer network element at a target time interval. The transceiver unit 131 is further configured to receive a second moment and/or first offset indication information from the first network management service producer network element, and a third moment and/or second offset indication information from the second network management service producer network element, where the second moment is a moment at which the measurement data of the first network object is obtained for the first time after the first measurement job is activated, the second moment and the first moment are spaced by an integer quantity of target time intervals, and the first offset indication information indicates that the second moment and the first moment are spaced by an integer quantity of target time intervals, and the third moment is a moment at which the measurement data of the second network object is obtained for the first time after the second measurement job is activated, the third moment and the first moment are spaced by an integer quantity of target time intervals, and the second offset indication information indicates that the third moment and the first moment are spaced by an integer quantity of target time intervals. The processing unit 132 is configured to, when the second moment is earlier than or equal to the third moment, respectively create digital twins of the first network object and the second network object based on measurement data generated by the first network object and the second network object at the third moment and after the third moment, or the processing unit 132 is configured to, when the second moment is later than or equal to the third moment, respectively create digital twins of the first network object and the second network object based on measurement data generated by the first network object and the second network object at the second moment and after the second moment.

Optionally, the first measurement job creation request information includes a first time sequence alignment policy, and the first time sequence alignment policy indicates the first network management service producer network element to cause the first moment and a moment at which the measurement data of the first network object is generated for the first time after the first measurement job is activated to be spaced by an integer quantity of target time intervals when time at which the first measurement job is created is later than the first moment.

Optionally, a first actual activation moment is a moment at which the first network management service producer network element activates the measurement job, the first actual activation moment and the first moment are spaced by n target time intervals, an interval between the first actual activation moment and the time at which the measurement job is created is less than one target time interval, n is a positive integer greater than or equal to 1, and the second moment and the first actual activation moment are spaced by one target time interval.

Optionally, the transceiver unit 131 is further configured to receive an alignment completion notification from the first network management service producer network element, where the alignment completion notification includes the second moment and/or the first offset indication information.

Optionally, the measurement job creation request information includes a second time sequence alignment policy, and the second time sequence alignment policy indicates the first network management service producer network element to report a second actual activation moment of the measurement job when the time at which the measurement job is created is later than the first moment.

Optionally, the transceiver unit 131 is further configured to receive an activation timeout notification from the first network management service producer network element, where the activation timeout notification includes the second actual activation moment. The transceiver unit 131 is further configured to send a time sequence alignment request to the first network management service producer network element, where the time sequence alignment request includes offset time. The transceiver unit 131 is further configured to receive a time sequence alignment response from the first network management service producer network element, where the time sequence alignment response includes the second moment and/or the offset indication information, where the second moment and the second actual activation moment are spaced by one target time interval and the offset time.

Optionally, the processing unit 132 is further configured to obtain a time difference between the second actual activation moment and the first moment. The transceiver unit 131 is further configured to send the time sequence alignment request to the first network management service producer network element when the time difference between the second actual activation moment and the first moment is greater than or equal to a specified threshold.

When the data management apparatus 1300 is configured to implement the function of the network management service producer network element in the method embodiment shown in FIG. 7, FIG. 8, or FIG. 10, the transceiver unit 131 is configured to receive measurement job creation request information from a network management service consumer network element, where the measurement job creation request information is used to request the network management service producer network element to activate, at a first moment, a measurement job used to obtain measurement data of a network object, and periodically report the measurement data of the network object to the network management service consumer network element at a target time interval. The transceiver unit 131 is further configured to send a second moment and/or offset indication information to the network management service consumer network element, where the second moment is a moment at which the measurement data of the network object is obtained for the first time after the measurement job is activated, the second moment and the first moment are spaced by an integer quantity of target time intervals, and the offset indication information indicates that the second moment and the first moment are spaced by an integer quantity of target time intervals.

Optionally, the apparatus further includes a processing unit 132 configured to create the measurement job based on the measurement job creation request information.

Optionally, the measurement job creation request information includes a first time sequence alignment policy, and the first time sequence alignment policy indicates the network management service producer network element to cause the first moment and a moment at which the measurement data of the network object is generated for the first time after the measurement job is activated to be spaced by an integer quantity of target time intervals when time at which the measurement job is created is later than the first moment.

Optionally, the processing unit 132 is further configured to determine a first actual activation moment and a second moment of the measurement job based on the measurement job creation request information, where the first actual activation moment is a moment at which the network management service producer network element activates the measurement job, the first actual activation moment and the first moment are spaced by n target time intervals, an interval between the first actual activation moment and the time at which the measurement job is created is less than one target time interval, n is a positive integer greater than or equal to 1, and the second moment and the first actual activation moment are spaced by one target time interval.

Optionally, the transceiver unit 131 is further configured to send an alignment completion notification to the network management service consumer network element, where the alignment completion notification includes the second moment and/or the offset indication information.

Optionally, the measurement job creation request information includes a second time sequence alignment policy, and the second time sequence alignment policy indicates the network management service producer network element to report a second actual activation moment of the measurement job when the time at which the measurement job is created is later than the first moment.

Optionally, the processing unit 132 is further configured to activate the measurement job at the second actual activation moment. The transceiver unit 131 is further configured to send an activation timeout notification to the network management service consumer network element, where the activation timeout notification includes the second actual activation moment. The transceiver unit 131 is further configured to receive a time sequence alignment request from the network management service consumer network element, where the time sequence alignment request includes offset time. The processing unit 132 is further configured to determine the second moment based on the time sequence alignment request, where the second moment and the second actual activation moment are spaced by one target time interval and the offset time.

Optionally, the transceiver unit 131 is further configured to send a time sequence alignment response to the network management service consumer network element, where the time sequence alignment response includes the second moment and/or the offset indication information.

Optionally, the transceiver unit 131 is further configured to send, to the network management service consumer network element, measurement data that is of the network object and that is generated at the second moment, and measurement data that is of the network object and that is generated at a moment, where the moment and the second moment are spaced by an integer quantity of target time intervals.

When the data management apparatus 1300 is configured to implement the function of the network management service consumer network element in the method embodiment shown in FIG. 12, the transceiver unit 131 is configured to respectively send first measurement job creation request information and second measurement job creation request information to a first network management service producer network element and a second network management service producer network element, where the first measurement job creation request information includes a first time sequence alignment indication, and the first time sequence alignment indication indicates the first network management service producer network element to wait for a first measurement job to be activated, and the second measurement job creation request information includes a second time sequence alignment indication, and the second time sequence alignment indication indicates the second network management service producer network element to wait for a second measurement job to be activated. The transceiver unit 131 is further configured to respectively receive first measurement job creation response information from the first network management service producer network element and second measurement job creation response information from the second network management service producer network element, where the first measurement job creation response information indicates that the first measurement job of a first network object has been created and the first measurement job of the first network object has not been activated, and the second measurement job creation response information indicates that the second measurement job of a second network object has been created and the second measurement job of the second network object has not been activated. The transceiver unit 131 is further configured to respectively send first activation request information and second activation request information to the first network management service producer network element and the second network management service producer network element, where the first activation request information includes a first activation moment of the first measurement job, the second activation request information includes a second activation moment of the second measurement job, and the first activation moment is consistent with the second activation moment.

Optionally, the apparatus further includes the transceiver unit 131 is further configured to respectively receive first activation response information and a second activation response message from the first network management service producer network element and the second network management service producer network element, where the first activation response information indicates that the first measurement job of the first network object has been activated, and the second activation response information indicates that the second measurement job of the second network object has been activated.

When the data management apparatus 1300 is configured to implement the function of the network management service producer network element in the method embodiment shown in FIG. 12, the transceiver unit 131 is configured to receive measurement job creation request information from a network management service consumer network element, where the measurement job creation request information includes a time sequence alignment indication, and the time sequence alignment indication indicates the network management service producer network element to wait for a measurement job of measurement data of a network object to be activated after the measurement job is created. The transceiver unit 131 is further configured to send measurement job creation response information to the network management service consumer network element, where the measurement job creation response information indicates that the measurement job has been created based on the measurement job creation request information and the measurement job has not been activated. The transceiver unit 131 is further configured to receive activation request information from the network management service consumer network element, where the activation request information includes an activation moment of the measurement job, and the activation moment of the measurement job of the network object is consistent with an activation moment of another network object in a data management system. The processing unit 132 is configured to activate the measurement job at the activation moment.

Optionally, the transceiver unit 131 is further configured to send, by the network management service consumer network element, activation response information, where the activation response information indicates that the measurement job has been activated.

Figure 14:
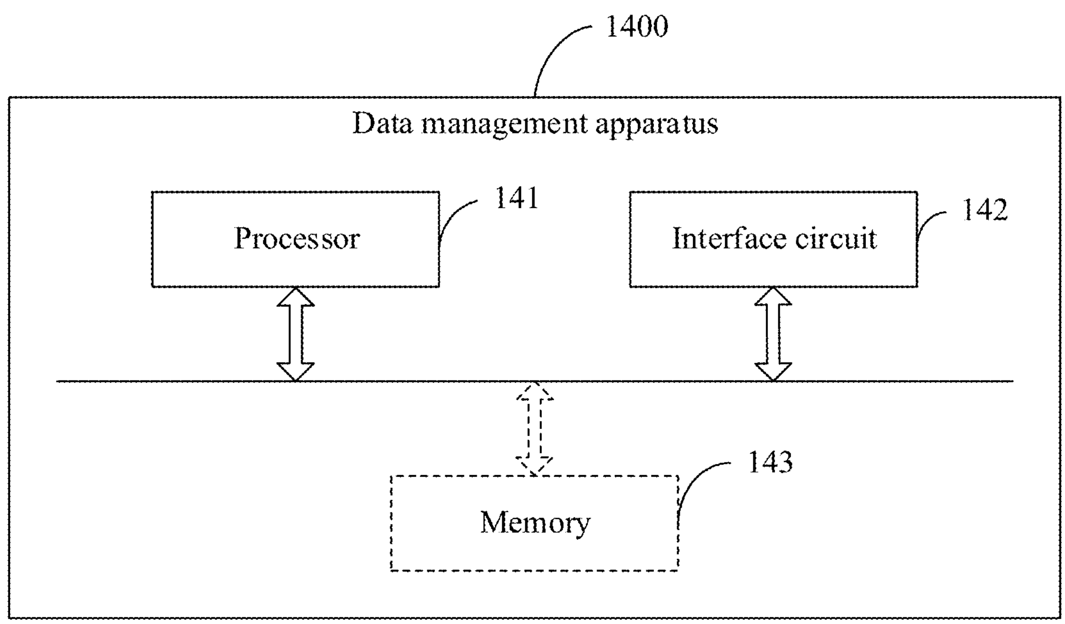
FIG. 14 is a diagram of a structure of another data management apparatus according to an embodiment of this disclosure.

FIG. 14 is a diagram of a structure of another data management apparatus according to an embodiment of this disclosure. The data management apparatus 1400 includes a processor 141 and an interface circuit 142. The processor 141 and the interface circuit 142 are coupled to each other. It may be understood that the interface circuit 142 may be a transceiver or an input/output interface. Optionally, the data management apparatus 1400 may further include a memory 143 configured to store instructions to be executed by the processor 141, store input data required by the processor 141 to run instructions, or store data generated after the processor 141 runs instructions.

The processor 141 is configured to perform the method in the method embodiment shown in FIG. 7, FIG. 8, FIG. 10, or FIG. 12.

When the data management apparatus is a chip used in the network management service producer network element, the chip implements a function of the network management service producer network element in the foregoing method embodiment. The chip receives information from another module (for example, a radio frequency module or an antenna) in the network management service producer network element, where the information is sent by a network management service consumer network element to the network management service producer network element, or the chip sends information to another module (for example, a radio frequency module or an antenna) in the network management service producer network element, where the information is sent by the network management service producer network element to a network management service consumer network element.

When the data management apparatus is a chip used in the network management service consumer network element, the chip implements a function of the network management service consumer network element in the foregoing method embodiment. The chip receives information from another module (for example, a radio frequency module or an antenna) in the network management service consumer network element, where the information is sent by a network management service producer network element to the network management service consumer network element, or the chip sends information to another module (for example, a radio frequency module or an antenna) in the network management service consumer network element, where the information is sent by the network management service consumer network element to a network management service producer network element.

It may be understood that, the processor in embodiments of this disclosure may be a central processing unit (CPU), or may be another general-purpose processor, a digital signal processor (DSP), an application-specific integrated circuit (ASIC), a field-programmable gate array (FPGA) or another programmable logic device, a transistor logic device, a hardware component, or any combination thereof. The general purpose processor may be a microprocessor or any regular processor or the like.

An embodiment of this disclosure further provides a computer-readable storage medium, where the computer-readable storage medium stores a computer program or instructions, and when the computer program or the instructions are executed, the method in the foregoing embodiment is implemented.

An embodiment of this disclosure further provides a computer program product including instructions. When the instructions are run on a computer, the computer is enabled to perform the method in the foregoing embodiment.

An embodiment of this disclosure further provides a data management system, including the foregoing data management apparatus.

An embodiment of this disclosure further provides a circuit. The circuit is coupled to a memory, and the circuit is configured to perform the method shown in the foregoing embodiment. The circuit may include a chip circuit.

It should be noted that one or more of the foregoing units or units may be implemented by software, hardware, or a combination of software and hardware. When any one of the foregoing modules or units is implemented by software, the software exists in a form of computer program instructions, and is stored in the memory. The processor may be configured to execute the program instructions and implement the foregoing method procedure. The processor may be built in a system on chip (SoC) or an ASIC, or may be an independent semiconductor chip. In addition to a core for executing software instructions to perform operation or processing, the processor may further include a necessary hardware accelerator, for example, an FPGA, a programmable logic device (PLD), or a logic circuit that implements a special-purpose logic operation.

When the foregoing modules or units are implemented by using hardware, the hardware may be any one or any combination of a CPU, a microprocessor, a DSP chip, a microcontroller unit (MCU), an artificial intelligence processor, an ASIC, a SoC, an FPGA, a PLD, a dedicated digital circuit, a hardware accelerator, or a non-integrated discrete device, and the hardware may run necessary software or does not depend on software to perform the foregoing method procedures.

Optionally, an embodiment of this disclosure further provides a chip system, including at least one processor and an interface. The at least one processor is coupled to a memory through the interface. When the at least one processor executes a computer program or instructions in the memory, the chip system is enabled to perform the method in any one of the foregoing method embodiments. Optionally, the chip system may include a chip, or may include a chip and another discrete component. This is not limited in this embodiment of this disclosure.

It should be understood that unless otherwise specified, "/" in descriptions of this disclosure indicates an "or" relationship between associated objects. For example, A/B may indicate A or B. A and B may be singular or plural. In addition, in the descriptions of this disclosure, "a plurality of" means two or more than two unless otherwise specified. "At least one of the following items (pieces)" or a similar expression thereof means any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural. In addition, to clearly describe the technical solutions in embodiments of this disclosure, terms such as first and second are used in embodiments of this disclosure to distinguish between same items or similar items that provide basically same functions or purposes. A person skilled in the art may understand that the terms such as "first" and "second" do not limit a quantity or an execution sequence, and the terms such as "first" and "second" do not indicate a definite difference. In addition, in embodiments of this disclosure, terms such as "example" or "for example" are used to represent giving an example, an illustration, or a description. Any embodiment or design scheme described as an "example" or "for example" in embodiments of this disclosure should not be explained as being more preferred or having more advantages than another embodiment or design scheme. Exactly, use of the terms such as "example" or "for example" is intended to present a related concept in a specific manner for case of understanding.

All or some of the foregoing embodiments may be implemented by using software, hardware, firmware, or any combination thereof. When a software program is used to implement embodiments, embodiments may be implemented completely or partially in a form of a computer program product. The computer program product includes one or more computer instructions. When the computer program instructions are loaded and executed on the computer, the procedure or functions according to embodiments of this disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DIGITAL VERSATILE DISC (DVD)), a semiconductor medium (for example, a solid-state drive (SSD)), or the like.

Although this disclosure is described with reference to embodiments, in a process of implementing this disclosure that claims protection, a person skilled in the art may understand and implement another variation of the disclosed embodiments by viewing the accompanying drawings, disclosed content, and appended claims. In the claims, "comprising" does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

The invention claimed is:

1. A data management apparatus comprising:

a memory configured to store instructions; and at least one processor coupled to the memory and configured to execute the instructions to cause the data management apparatus to:

send measurement job creation request information to a first network management service producer network element, wherein the measurement job creation request information comprises a first time sequence alignment policy that is separate from and distinct from measurement job configuration parameters, and wherein the first time sequence alignment policy specifies that, when a time at which a first measurement job is created is later than a first moment:

an actual activation moment at which the first measurement job is activated is to be spaced from the first moment by n target time intervals, wherein an interval between the actual activation moment and the time at which the first measurement job is created is less than one target time interval, and wherein n is a positive integer greater than or equal to one; and a second moment at which first measurement data of a first network object is generated for a first time after the first measurement job is activated is to be set to the actual activation moment plus one target time interval;

receive first offset indication information from the first network management service producer network element, wherein the first offset indication information indicates that the second moment and the first moment are spaced by an integer quantity of the target time intervals;

receive the first measurement data from the first network management service producer network element; and generate, based on the first offset indication information and the first measurement data, a first digital twin of the first network object.

2. The data management apparatus of claim 1, wherein the at least one processor is further configured to execute the instructions to cause the data management apparatus to receive a first indication indicating the second moment from the first network management service producer network element and a third moment or second offset indication information from a second network management service producer network element, wherein the time at which the first network management service producer network element creates the first measurement job is later than the first moment, wherein the second moment and the first moment are spaced by a second integer quantity of the target time intervals, wherein the first offset indication information indicates that the second moment and the first moment are spaced by the second integer quantity of the target time intervals, wherein the third moment is when second measurement data of a second network object is obtained for a first time after a second measurement job is activated, wherein the third moment and the first moment are spaced by a third integer quantity of the target time intervals, wherein the second offset indication information indicates that the third moment and the first moment are spaced by the third integer quantity of the target time intervals, and wherein the second moment is earlier than or equal to the third moment:

create a second digital twin of the first network object based on third measurement data generated by the first network object at the third moment and subsequent moments; and create a third digital twin of the second network object based on fourth measurement data generated by the second network object at the third moment and subsequent moments.

3. The data management apparatus of claim 1, wherein the at least one processor is further configured to execute the instructions to cause the data management apparatus to: receive a first indication indicating the second moment from the first network management service producer network element and a third moment or second offset indication information from a second network management service producer network element, wherein the time at which the first network management service producer network element creates the first measurement job is later than the first moment, wherein the second moment and the first moment are spaced by a second integer quantity of the target time intervals, wherein the first offset indication information indicates that the second moment and the first moment are spaced by the second integer quantity of the target time intervals, wherein the third moment is when second measurement data of a second network object is obtained for a first time after a second measurement job is activated, wherein the third moment and the first moment are spaced by a third integer quantity of the target time intervals, wherein the second offset indication information indicates that the third moment and the first moment are spaced by the third integer quantity of target time intervals, and wherein the second moment is later than or equal to the third moment:

create a fourth digital twin of the first network object based on fifth measurement data generated by the first network object at the second moment and subsequent moments; and create a fifth digital twin of the second network object based on sixth measurement data generated by the second network object at the second moment and subsequent moments.

4. The data management apparatus of claim 1, wherein the at least one processor is further configured to execute the instructions to cause the data management apparatus to receive an alignment completion notification from the first network management service producer network element, and wherein the alignment completion notification comprises the second moment and the first offset indication information.

5. The data management apparatus of claim 1, wherein the at least one processor is further configured to execute the instructions to cause the data management apparatus to receive an alignment completion notification from the first network management service producer network element, and wherein the alignment completion notification comprises the second moment.

6. The data management apparatus of claim 1, wherein the at least one processor is further configured to execute the instructions to cause the data management apparatus to receive an alignment completion notification from the first network management service producer network element, and wherein the alignment completion notification comprises the first offset indication information.

7. The data management apparatus of claim 1, wherein the measurement job creation request information comprises a second time sequence alignment policy that is separate from and distinct from measurement job configuration parameters, wherein the second time sequence alignment policy specifies that the actual activation moment of the first measurement job is to be reported to the data management apparatus, and wherein the time at which the first measurement job is created is later than the first moment.

8. The data management apparatus of claim 7, wherein the at least one processor is further configured to execute the instructions to cause the data management apparatus to:

receive an activation timeout notification from the first network management service producer network element, wherein the activation timeout notification comprises the actual activation moment;

send a time sequence alignment request to the first network management service producer network element, wherein the time sequence alignment request comprises an offset time; and receive a time sequence alignment response from the first network management service producer network element, wherein the time sequence alignment response comprises a third moment at which the first measurement data is obtained for a first time after the first measurement job is activated and the first offset indication information, and wherein the third moment and the actual activation moment are spaced by one target time interval and the offset time.

9. The data management apparatus of claim 8, wherein the at least one processor is further configured to execute the instructions to cause the data management apparatus to:

obtain a time difference between the actual activation moment and the first moment; and send the time sequence alignment request to the first network management service producer network element when the time difference is greater than or equal to a threshold.

10. The data management apparatus of claim 7, wherein the at least one processor is further configured to execute the instructions to cause the data management apparatus to:

receive an activation timeout notification from the first network management service producer network element, wherein the activation timeout notification comprises the actual activation moment;

send a time sequence alignment request to the first network management service producer network element, wherein the time sequence alignment request comprises an offset time; and receive a time sequence alignment response from the first network management service producer network element, wherein the time sequence alignment response comprises a third moment at which the first measurement data is obtained for a first time after the first measurement job is activated or the first offset indication information, and wherein the third moment and the actual activation moment are spaced by one target time interval and the offset time.

11. The data management apparatus of claim 10, wherein the at least one processor is further configured to execute the instructions to cause the data management apparatus to:

obtain a time difference between the actual activation moment and the first moment; and send the time sequence alignment request to the first network management service producer network element when the time difference is greater than or equal to a threshold.

12. A data management apparatus comprising:

a memory configured to store instructions; and at least one processor coupled to the memory and configured to execute the instructions to cause the data management apparatus to:

send measurement job creation request information to a first network management service producer network element, wherein the measurement job creation request information comprises a first time sequence alignment policy, wherein the first time sequence alignment policy instructs the first network management service producer network element to cause a first moment and a second moment at which first measurement data of a first network object is generated for a first time after a first measurement job is activated to be spaced by a first integer quantity of target time intervals when a time at which the first measurement job is created is later than the first moment and to generate first offset indication information, wherein the first offset indication information instructs the data management apparatus to generate a first digital twin of the first network object based on the first measurement data, wherein the measurement job creation request information further comprises a second time sequence alignment policy, wherein the second time sequence alignment policy instructs the first network management service producer network element to report a first actual activation moment of the first measurement job, and wherein the time at which the first measurement job is created is later than the first moment;

receive the first offset indication information from the first network management service producer network element;

receive an activation timeout notification from the first network management service producer network element, wherein the activation timeout notification comprises the first actual activation moment;

obtain a time difference between the first actual activation moment and the first moment;

send a time sequence alignment request to the first network management service producer network element when the time difference is greater than or equal to a threshold, wherein the time sequence alignment request comprises an offset time; and receive a time sequence alignment response from the first network management service producer network element, wherein the time sequence alignment response comprises the second moment and the first offset indication information, and wherein the second moment and the first actual activation moment are spaced by one target time interval and the offset time.

13. The data management apparatus of claim 12, wherein the at least one processor is further configured to execute the instructions to cause the data management apparatus to:

send second measurement job creation request information to a second network management service producer network element, wherein the second measurement job creation request information comprises a third time sequence alignment policy, and wherein the third time sequence alignment policy instructs the second network management service producer network element to report a second actual activation moment of a second measurement job when a time at which the second measurement job is created is later than the first moment;

receive a second activation timeout notification from the second network management service producer network element, wherein the second activation timeout notification comprises the second actual activation moment;

obtain a second time difference between the second actual activation moment and the first moment;

send a second time sequence alignment request to the second network management service producer network element when the second time difference is greater than or equal to the threshold, wherein the second time sequence alignment request comprises a second offset time; and receive a second time sequence alignment response from the second network management service producer network element, wherein the second time sequence alignment response comprises a third moment or second offset indication information, and wherein the third moment and the second actual activation moment are spaced by one target time interval and the second offset time.

14. The data management apparatus of claim 13, wherein the at least one processor is further configured to execute the instructions to cause the data management apparatus to respectively create the first digital twin of the first network object and a second digital twin of a second network object based on measurement data generated by the first network object and the second network object at the third moment and after the third moment, when the second moment is earlier than or equal to the third moment.

15. The data management apparatus of claim 13, wherein the at least one processor is further configured to execute the instructions to cause the data management apparatus to respectively create the first digital twin of the first network object and a second digital twin of a second network object based on measurement data generated by the first network object and the second network object at the second moment and after the second moment, when the second moment is later than or equal to the third moment.

16. The data management apparatus of claim 12, wherein the at least one processor is further configured to execute the instructions to cause the data management apparatus to send an activation timeout notification response to the first network management service producer network element upon receiving the activation timeout notification, and wherein the activation timeout notification response indicates that the activation timeout notification has been received.

17. The data management apparatus of claim 12, wherein the at least one processor is further configured to execute the instructions to cause the data management apparatus to:

receive the first measurement data from the first network management service producer network element, wherein the first measurement data comprises measurement data generated by the first network object at the second moment and measurement data generated by the first network object at moments spaced from the second moment by an integer quantity of target time intervals; and generate, based on the first measurement data, the first digital twin of the first network object.

18. The data management apparatus of claim 12, wherein the activation timeout notification further comprises a measurement job identifier indicating a measurement job for which activation has timed out, and wherein the time sequence alignment request further comprises the measurement job identifier indicating the first measurement job on which time sequence alignment is to be performed.

19. The data management apparatus of claim 12, wherein the at least one processor is further configured to execute the instructions to cause the data management apparatus to calculate the offset time based on the first actual activation moment and the first moment, wherein the offset time is a difference between a nearest future value of the first moment plus n target time intervals and the first actual activation moment, and wherein n is a positive integer greater than or equal to one.

20. A data management apparatus comprising:

a memory configured to store instructions; and at least one processor coupled to the memory and configured to execute the instructions to cause the data management apparatus to:

send measurement job creation request information to a first network management service producer network element, wherein the measurement job creation request information comprises a first time sequence alignment policy, wherein the first time sequence alignment policy instructs the first network management service producer network element to cause a first moment and a second moment at which first measurement data of a first network object is generated for a first time after a first measurement job is activated to be spaced by a first integer quantity of target time intervals when a time at which the first measurement job is created is later than the first moment and to generate first offset indication information, wherein the first offset indication information instructs the data management apparatus to generate a first digital twin of the first network object based on the first measurement data, wherein the measurement job creation request information further comprises a second time sequence alignment policy, wherein the second time sequence alignment policy instructs the first network management service producer network element to report an actual activation moment of the first measurement job, and wherein the time at which the first measurement job is created is later than the first moment;

receive the first offset indication information from the first network management service producer network element;

receive an activation timeout notification from the first network management service producer network element, wherein the activation timeout notification comprises the actual activation moment;

obtain a time difference between the actual activation moment and the first moment;

send a time sequence alignment request to the first network management service producer network element when the time difference is greater than or equal to a threshold, wherein the time sequence alignment request comprises an offset time; and receive a time sequence alignment response from the first network management service producer network element, wherein the time sequence alignment response comprises the second moment or the first offset indication information, and wherein the second moment and the actual activation moment are spaced by one target time interval and the offset time.

* * * * *